(12) United States Patent
Hyman et al.

(10) Patent No.: US 6,483,056 B2
(45) Date of Patent: Nov. 19, 2002

(54) MICROFABRICATED RELAY WITH MULTIMORPH ACTUATOR AND ELECTROSTATIC LATCH MECHANISM

(76) Inventors: Daniel J Hyman, 1718 E. Ocean Blvd. #4, Long Beach, CA (US) 90802; Mark K Hyman, 1718 E. Ocean Blvd. #4, Long Beach, CA (US) 90802; Peter D Bogdanoff, 120 S. Mentor Ave. #4, Pasadena, CA (US) 91105

( * ) Notice: Subject to any disclaimer, the term of this patent is extended or adjusted under 35 U.S.C. 154(b) by 0 days.

(21) Appl. No.: 09/984,288

(22) Filed: Oct. 29, 2001

(65) Prior Publication Data

US 2002/0050881 A1 May 2, 2002

Related U.S. Application Data

(60) Provisional application No. 60/243,786, filed on Oct. 27, 2000, and provisional application No. 60/243,788, filed on Oct. 27, 2000.

(51) Int. Cl.[7] .............................................. H01H 57/00
(52) U.S. Cl. ....................... 200/181; 310/307; 310/309; 310/330; 310/332
(58) Field of Search ................... 200/181; 310/306–311, 310/328, 330, 331, 332

(56) References Cited

U.S. PATENT DOCUMENTS 6,057,520 A * 5/2000 Goodwin-Johansson .... 200/181

* cited by examiner

*Primary Examiner*—Ramon M. Barrera
(74) *Attorney, Agent, or Firm*—Pillsbury Winthrop LLP

(57) ABSTRACT

This invention is a new type of relay that incorporates the functional combination of multimorph actuator elements with electrostatic state holding mechanisms in the development of a micromachined switching device. This combination of elements provides the benefits of high-force multimorph actuators with those of zero-power electrostatic capacitive latching in microfabricated relays with high reliability and low power consumption. The operation of the relay invention allows for several stable states for the device: a passive state using no power, an active state driving the multimorph actuator with some power, and a latched state electrostatically holding the switch state requiring essentially no power. Multimorph actuators covered by this invention include piezoelectric, thermal, and buckling multimorph actuation mechanisms. These devices use one or more sets of actuator armatures in cantilever or fixed-beam configurations, and use one or more sets of electrostatic latch electrodes for state holding.

20 Claims, 6 Drawing Sheets

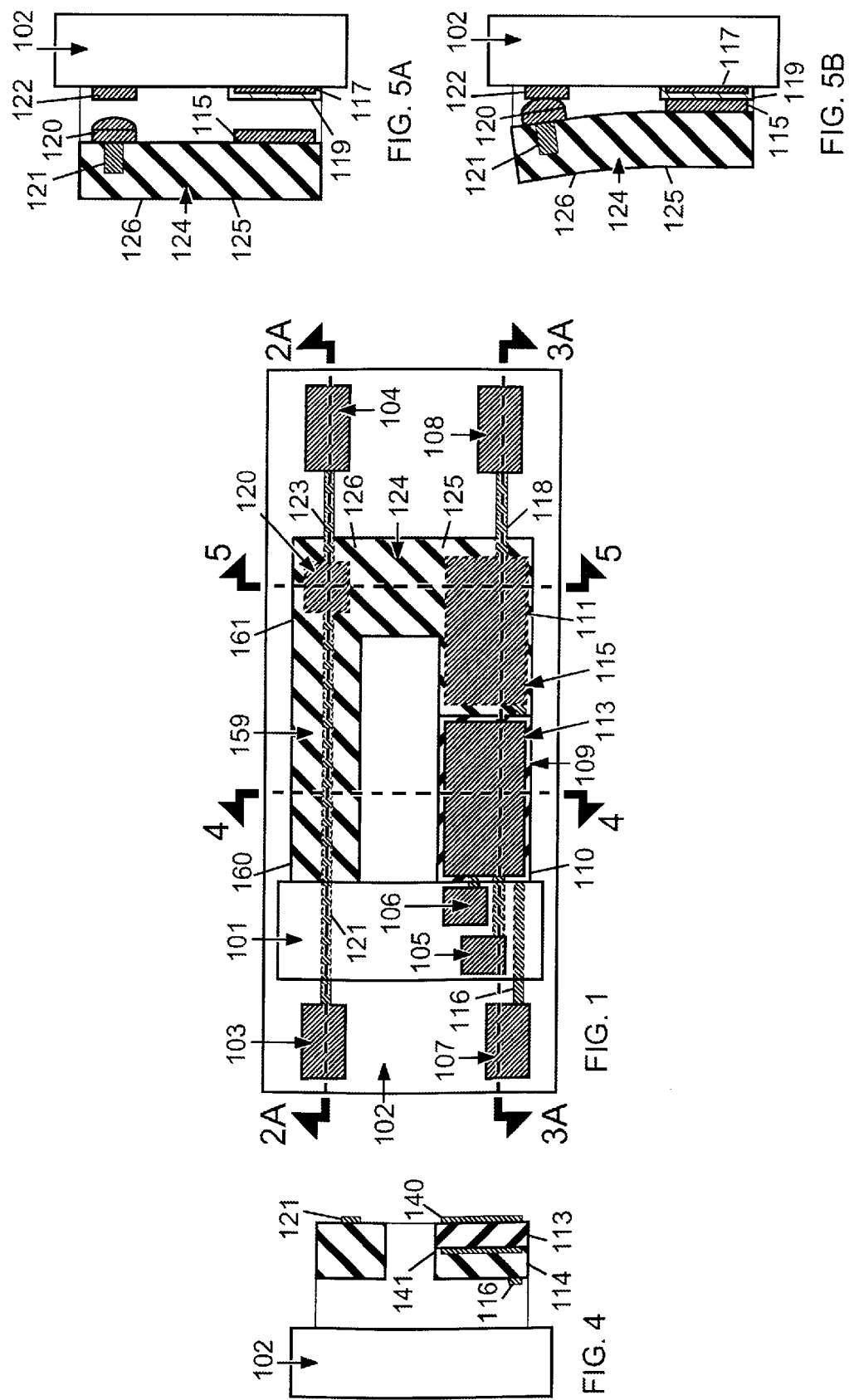

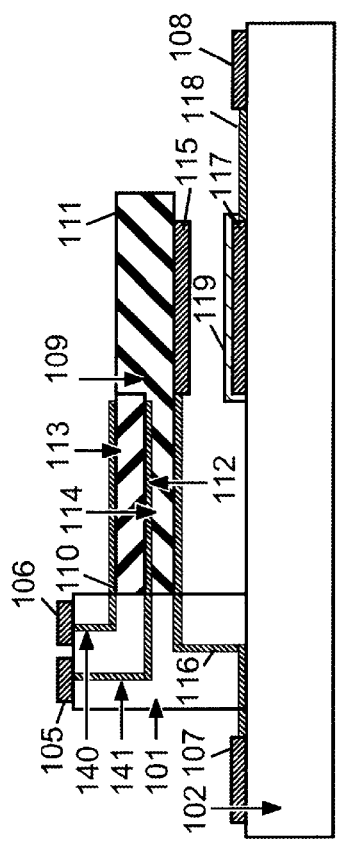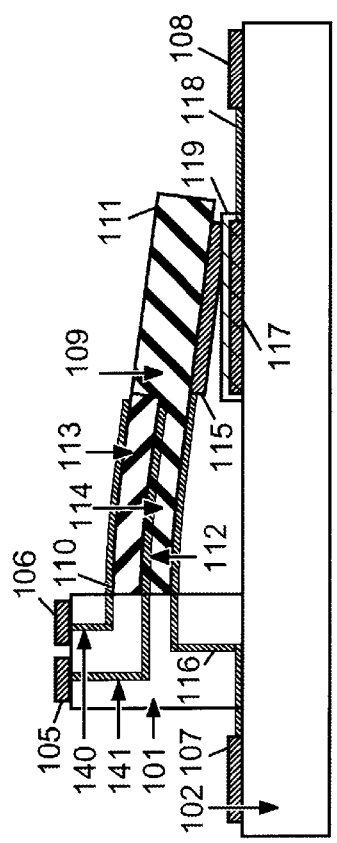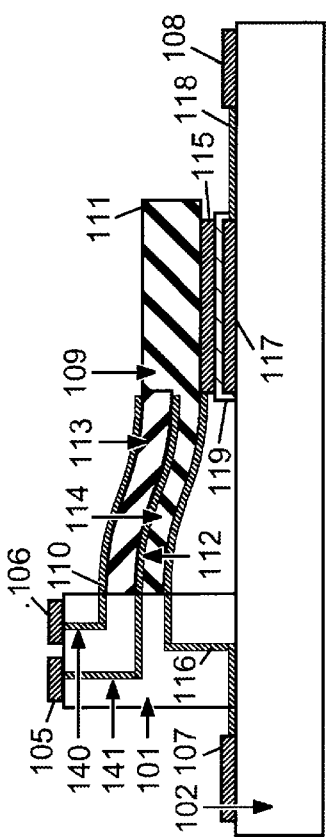
FIG. 3A  FIG. 3B  FIG. 3C
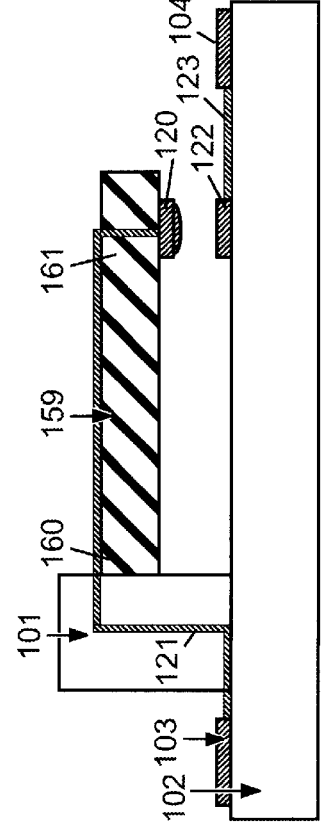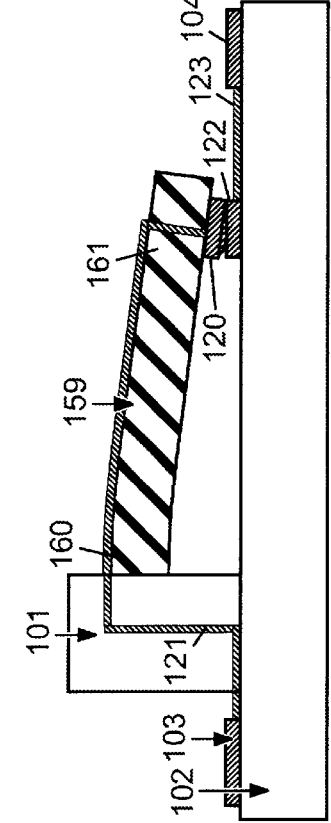
FIG. 2A  FIG. 2B  FIG. 2C

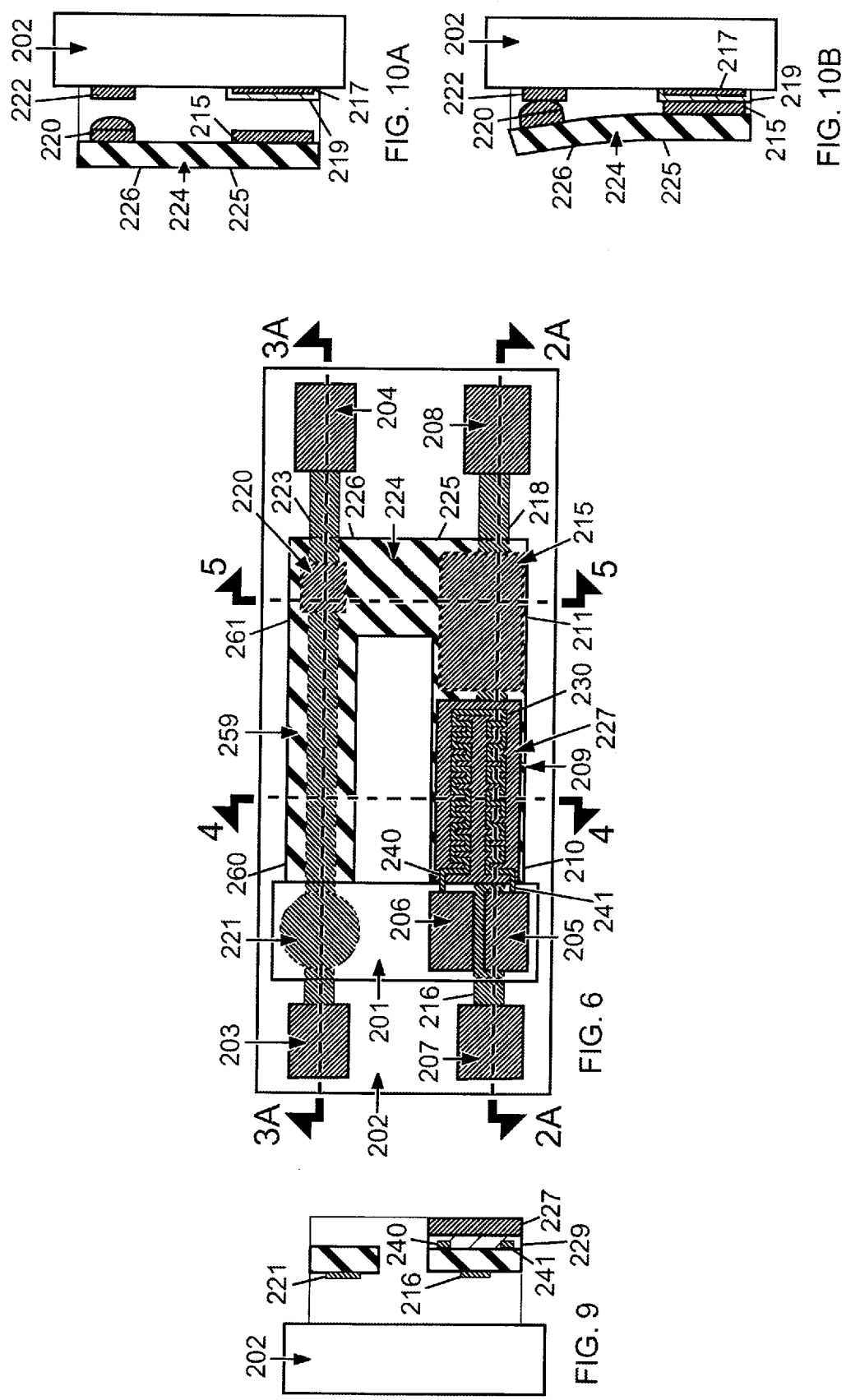

MICROFABRICATED RELAY WITH MULTIMORPH ACTUATOR AND ELECTROSTATIC LATCH MECHANISM

CROSS-REFERENCE TO RELATED APPLICATIONS

A provisional utility patent application describing this device is 60/243,786, filed Oct. 27, 2000 and bearing the same as the present application. A second application, describing a related device is 60/243,788, also filed on Oct. 27, 2000 and titled "Microfabricated Double-Throw Relay with Multimorph Actuator and Electrostatic Latch Mechanism." Each of these provisional utility patents relate to aspects of the present invention and are hereby incorporated by reference.

STATEMENT REGARDING FEDERALLY SPONSORED RESEARCH

None of the research and development leading to the present invention was Federally sponsored.

BACKGROUND OF THE INVENTION

This invention pertains to the general field of switching devices, and more specifically, to the field of microfabricated relays. Since the original concept of a microfabricated switching device was created by Petersen in 1979, many attempts have been made to develop switches and relays for applications of low power and high frequency. The goal of this work is to improve the cost-effectiveness and performance of switching technologies by using miniature, batch-fabricated, photolithographically-defined, moveable structures as part of a mechanical device.

Microfabricated electromechanical systems (MEMS) promise high lifetimes, low cost, small sizes, and faster speeds than switching devices manufactured by conventional means, and offer higher performance than solid-state devices. In many applications, particularly those in high performance instrumentation, automated test equipment, radar, and communication systems, switching devices with certain qualities are required or preferred. Specific values vary by application and are quantified where appropriate in the detailed description of the invention:

1) Relay rather than switch functionality, to isolate control signals from load signals 2) Low resistance Ohmic-contacts between the relay electrodes 3) Low power usage to toggle relay open/close states 4) Zero or very low power to maintain a particular relay open/close state 5) High precision, low cost manufacturing 6) High speed, high force mechanical closure of relay contacts 7) High speed, high force mechanical opening of relay contacts 8) Easily achieved control signals and operating requirements Many switching device development efforts have been undertaken to obtain some of these advantages, but none have succeeded in attaining all. The switching device designs of prior art can be largely discussed in terms of two major categories of devices: those employing electrostatic actuating mechanisms and those employing bimorph actuating mechanisms. Each type of actuating mechanism has intrinsic qualities and advantages, as well as physical limitations preventing prior designs from obtaining every desirable quality listed above.

Electrostatically actuated devices employ two (or more) bias electrodes across which a voltage is applied. Opposite charges are generated on the surfaces of the facing electrodes, and an electrostatic force is generated. If the bias electrodes are allowed to deflect towards each other, actuation is enabled. The switch or relay contact electrodes in an electrostatically actuated device would be mechanically coupled to these moving bias electrodes, so that the contact electrodes would mate together or separate as the voltage was applied and removed.

Electrostatic actuation intrinsically supports a number of the operating qualities described, and, as a result, is the most widely examined MEMS actuation mechanism for switches and relays. Electrostatic actuators enable Ohmic-contact relays and switches, although low resistances are difficult to achieve. They require effectively zero power to toggle states and effectively zero power to maintain states. A designer can employ microfabrication techniques to develop precise, low-cost electrostatic actuators. These actuators can provide high speeds, but high closure force is difficult to achieve, and they are not amenable to developing high opening forces. These actuators are difficult to design with low drive voltages (less than 10 V) typical of modern integrated circuits, though drive currents are typically negligible (less than 1 $\mu$A).

The literature contains numerous examples of electrostatic MEMS switches and relays demonstrating low force actuation with very low power usage. Loo, et al., U.S. Pat. No. 6,046,659, describes a typical example of a double-contact cantilever MEMS relay, employing an insulator-metal-insulator stack for material stress compensation. Other cantilever MEMS devices employ different contact metals for improved performance, such as a relay by Yao, et al., U.S. Pat. No. 5,578,976, and a switch by Buck, U.S. Pat. No. 5,258,591. James, et al., U.S. Pat. No. 5,479,042, has double contact relays incorporating bumps to improve manufacturing. Zavracky, U.S. Pat. No. 5,638,946 adds a novel element for actuation, using separate fixed electrodes for biasing, after his early work in solid metal switches. The literature includes switching device work by Milanovi, et al. wherein devices are transferred from one substrate to another for improved high-frequency signal switching.

Several notable attempts have been made to improve performance at larger signal loads, typically by increasing device size and force at the expense of size, speed, and, reliability. A typical example is that of Lee, U.S. Pat. No. 6,054,659, with a copper device an order of magnitude larger and more forceful than the efforts previously noted. Komura et al. and Hah et al. have also developed millimeter-sized two-contact electrostatic MEMS U relays for moderate signal loads. A device by Goodwin-Johansson, U.S. Pat. No. 6,057,520 reduces arcing under hot-switch conditions by varying the contact resistance of electrodes as the device opens and closes.

A few electrostatic MEMS switching devices have been designed to lower drive voltage requirements at the expense of device size, contact force, and, often, manufacturing disadvantages. Shen et al. and Pacheco have reduced voltage requirements by increasing bias electrode size and armature flexibility. Ichiya, et al., U.S. Pat. No. 5,544,001, incorporates novel use of stepped and sloped substrate bias electrodes for reducing drive voltage.

A few electrostatic MEMS devices have been designed with sets of bias electrodes to open the device with increased speed and force as compared to the passive restoring forces of deflected springs more typically found in MEMS devices. Hah, et al. is a typical example, combining torsional spring restoring forces with opposing bias electrodes to drive relays open. Kasano, et al., U.S. Pat. No. 5,278,368 describes a double-contact MEMS relay with drive-open electrodes as well as novel embedded electrets to reduce overall voltage requirements.

Bimorph actuators, unlike electrostatic actuators, transduce the control signals into mechanical deformation within the actuator itself. Bimorph (or, more generally, multimorph) actuators are comprised of layers demonstrating different physical responses to a particular stimulus. A thermal bimorph, for example, might have a first layer with a high coefficient of thermal expansion (above 10 ppm/° C.) and a second layer with a low coefficient of thermal expansion (below 5 ppm/° C.). When this bimorph is exposed to an increase in temperature, the relative expansion of the first layer is constrained by the intimate contact to the second layer, and the actuator curls in response. Devices employ this curl to perform work, and the forces generated by bimorphs can be much higher than those attainable by electrostatic actuators.

Bimorph actuation also intrinsically supports a number of the operating qualities described above, and, as a result, is the second most widely examined MEMS actuation mechanism for switches and relays. They can be used in Ohmic-contact devices, and the high forces generated by bimorph actuators result in low contact resistances. They can be designed to actuate with low power to toggle states, though only certain types of bimorphs allow for low power state latching. Bimorph actuators can be made to provide high speeds and high closure force, and can be designed to provide similarly high opening forces and speeds. Some types of bimorph actuators can also be designed with low drive voltages and low drive currents.

Most switching devices with bimorph actuation mechanisms select piezoelectric bimorph actuators to keep power consumption low, and such devices typically demonstrate many of the desirable qualities previously listed. Few MEMS efforts have explored piezoelectric bimorphs actuators, however, due to the manufacturing difficulties associated with piezoelectric materials. Additionally, actuation of piezoelectric bimorphs typically requires complex high voltage waveforms to prevent hysteresis and degradation. Farrall, U.S. Pat. No. 4,620,123, describes a switching device featuring arrays of metalpiezoelectric-metal tri-layer actuators. Kornrumpf, U.S. Pat. No. 4,819,126, developed a series of piezoelectric bimorph actuators extending from a central anchor region for handling varying signal loads. Kornrumpf, U.S. Pat. No. 4,916,349, also designed a piezoelectric relay that latches states by changing residual polarization within the piezoelectric bimorph itself, allowing controllable zero-power passive latching. Tanaka, U.S. Pat. No. 4,403,166, developed a device consisting of opposing cantilever piezoelectric bimorphs, generating large closure force and travel. All of these devices were manufactured by conventional means, and featured all or many traditional piezoelectric material limitations.

Most microfabricated bimorph actuators employ thermal bimorphs due to the ease of manufacture and drive signal generation. Such devices typically require constant application of power to maintain an active state, and often have speed restrictions based on thermal transport phenomena. Field, et al., U.S. Pat. No. 5,467,068, discloses a general purpose thermal bimorph relay having stacked substrates with multiple novel contact structures. Norling, U.S. Pat. No. 5,463,233, has a temperature sensitive relay having multiple contact electrodes and an electrostatic bias electrode for temperature sensing, a device quite comparable to modern thermistors. Carr, U.S. Pat. No. 5,796,152, has developed a relay comprising engineered sets of opposing bimorphs, capable of passive mechanical latching at the expense of large size, speed, and power usage.

MEMS relays by Gevatter, et al., U.S. Pat. No. 5,666,258, and Schlaak, et al., U.S. Pat. Nos. 5,629,565 and 5,673,785, feature both bimorph and electrostatic actuation in which a piezoelectric bimorph actuator has integrated electrostatic bias electrodes to assist in the closing action of the device. The advantage of such devices is an increase in closure force and reduction in drive voltage, at the penalty of heightened complexity and requiring simultaneous driving of both actuation mechanisms for proper relay functionality.

Despite the demonstrated long-felt need and the active and wide-ranging efforts by numerous researchers and groups including those noted above, none of the resulting devices embody all of the desired attributes for high-performance signal switching for instrumentation, radar, and communication systems. The invention described herein is the first device to attain each of these qualities with few associated disadvantages and limitations.

BRIEF SUMMARY OF THE INVENTION

In the field of micromachined switches and relays, there are many devices which incorporate multimorph or electrostatic actuator elements. Multimorph actuators are used primarily because of their capacity to generate large forces for any given drive power, voltage, or electric current. Electrostatic actuators are used because of their capacity to use very low powers for actuation and holding switches or relays in an open or closed position. There has been a desire in the community to develop devices that incorporate large forces for reliable contacts while using low power, but no previous effort has been successful. This invention is the first attempt to achieve this goal, and does so by incorporating both high-force multimorph actuation with zero-power electrostatic latching mechanisms.

The operation of the invention allows for different stable states for the device. The first state is a passive state, which is the natural condition of the relay when no control signals are applied to the device. When an active state is desired, a drive control signal is applied to the relay actuator(s), where the mechanical limitations of the device prevent further deflection of the relay armatures. Once changed, it is desirable to hold the state for what may be an indefinite period of time in a latched state, so a latch control signal is applied to capacitive elements to attract them and hold them together with electrostatic forces. It is then possible to remove the drive control signals from the actuator, and the relay will remain latched. Removal of the latch control signal can then send the relay back to the passive state.

DEFINED TERMS

Of interest to readers unfamiliar with microfabricated devices is a brief introduction to terminology and units. The description of the drawings and detailed description of the invention to follow include precise terms that describe numbered elements of the drawings as they occur in the text. For the purposes of this provisional utility patent application, each term is considered a reserved descriptor in accordance with accepted relay industry terminology:

Milli-, m, is the standard S.I. prefix for one one-thousandth (1/1,000).

Micro-, $\mu$, is the standard S.I. prefix for one one-millionth (1/1,000,000).

Nano-, n, is the standard S.I. prefix for one one-billionth (1/1,000,000,000).

Newton, N is a standard S.I. unit of force equal to one kilogram-meter-per-second-squared.

Micron, μm, or micrometer is a unit of length equal to one-one-thousandth of a millimeter.

Microfabrication is defined as a fabrication method of defining components delineated through photolithographic techniques made popular by the integrated circuit developer community.

Micromachining is defined as the action of delineating a microfabricated element that has been photolithographically defined, often performed by an etching process using acids or bases.

An actuation is defined as the action of opening or closing a relay or other switching device.

An actuator is defined as the energy conversion mechanism responsible for actuation.

An armature is defined as any element that is deflected or moved by an actuator in order to open or close a relay or other switching device.

A multimorph is defined as an actuator comprised of a combination of layers that change size when exposed to a stimulus, the size changes varying for two or more different layers.

A bimorph is defined as a multimorph with exactly two layers.

A multimorph layer is defined as any one layer of a multimorph, where each specific layer may or may not be sensitive to the drive stimulus defined for the multimorph.

A piezoelectric multimorph is defined as a multimorph actuator sensitive to electric voltage stimuli, wherein one or more layers have non-zero coefficients of piezoelectricity.

A thermal multimorph is defined as a multimorph actuator sensitive to heat or cold stimuli, wherein one or more layers have non-zero coefficients of thermal expansion.

A buckling multimorph is defined as a multimorph actuator sensitive to deflection stimuli, wherein one or more layers have non-zero stress at levels pursuant to buckling phenomena.

A fixed base is defined as a rigid, integral relay region that provides mechanical support.

A base substrate is defined as a microfabrication substrate forming one part of a fixed base.

A load signal is defined as the signal to be switched by a relay or other switching device.

A load signal line is defined as a port (input or output) for the load signal to be switched.

An armature contact element is defined as an element located on an armature that physically engages and/or disengages with other contact elements in order to form and/or break a conductive path for a load signal to progress from an input to an output load signal line.

A contact armature is defined as an armature that has attached armature contact elements.

A base substrate contact element is defined as an element located on a base substrate that physically engages and/or disengages with other contact elements in order to form and/or break a conductive path for a signal to progress from an input to an output load signal line.

A drive signal is defined as a signal that initiates the actuation of a relay or switch.

A drive signal line is defined as a line upon which is directed a drive signal. At least two drive signal lines are necessary for electric drive signals, one for the signal and one for reference.

A latch signal is defined as a signal that holds a relay or switch in an open or closed state.

A latch signal line is defined as a line upon which is directed a latch signal. At least two latch signal lines are necessary for electric latch signals, one for the signal and one for reference.

An armature electrode is defined as a conductive area attached to the armature, upon which latch signals or their references are directed.

A base substrate electrode is defined as a conductive area attached to the base substrate, upon which latch signals or their references are directed.

A latch electrode insulator is defined as an insulating region preventing electrical contact from occurring between the armature electrode and the base substrate electrode.

This invention covers switching speeds and signal loads that are generally small compared to relay industry standards. A functional distinction between $\mu$A and $\mu$A, for example, is not made with regards to load signal strength for conventional relays, whereas the performance and design differences of microfabricated relays for these different load signals can be significant. For purposes of this patent, the following speeds and signal loads are defined, noting that these classifications differ from those defined in relay industry standards:

Very fast switching times are defined as less than 100 $\mu$sec.

Fast switching times are defined as 100 $\mu$sec to 1 $\mu$sec.

Moderate switching times are defined as 1 $\mu$sec to 100 $\mu$sec.

Slow switching times are defined as 1 $\mu$sec to 10 $\mu$sec.

Very slow switching times are defined as greater than 10 $\mu$sec.

Very low signal loads are defined as less than 10 $\mu$A DC current or 100 $\mu$W RF power.

Low signal loads are defined as 10 $\mu$A to 10 mA or 100 $\mu$W to 100 mW.

Moderate signal loads are defined as 10 mA to 500 mA or 100 mW to 5 W.

High signal loads are defined as 500 mA to 5 A or 5 W to 50 W.

Very high signal loads are defined as greater than 5 A of DC current or 50 W of RF power.

BRIEF DESCRIPTION OF THE DRAWINGS

All attached drawings illustrate cross-sectional views other than FIGS. 1, 6, and 11. Material designations are made through functional cross-hatching, succinct black borders, and numeration of all elements. All elements shown in white or thick cross-hatching represent a material that is electrically insulating. Elements shown in a thin cross-hatched pattern represent materials that are electrical conductors. The cross-hatched patterns for all elements are maintained in the plan-view illustrations of FIGS. 1, 6, and 11 for the sake of clarity and continuity. Semiconducting materials may be used in alternative embodiments to manufacture the described insulators and/or conductors depending on the doping level of the semiconductor.

FIG. 1 is a plan-view illustration of one embodiment of the invention with cross-sectional lines and views provided for clarity, and with many elements that may be buried below the top surface shown in dashed outline. Two cross-sections shown along with FIG. 1 are FIGS. 2A and 3A, which illustrate view of a load armature and actuator armature, respectively. FIG. 4 pictures a cross-sectional schematic of the armatures in the region of a multimorph actuator, to illustrate the relationship between electrical connections. FIGS. 5A and 5B show the cross-sections of the relay region with the latching and contact mechanisms in open and closed relay states, respectively. The bending function of a contact armature is illustrated in FIG. 5B, which depicts the relay is in a fully closed and latched state.

FIGS. 2A, 2B, and 2C illustrate cross-sectional views of the load armature in three operational states of the device. FIG. 2A is the load armature when the relay is in the passive state. FIG. 2B illustrates the curvature induced in the armature when a relay is driven into an active state. FIG. 2C illustrates a curvature induced in the relay when in the latched state.

FIGS. 3A, 3B, and 3C illustrate cross-sectional views of a piezoelectric multimorph actuator armature in the same three operational states of the device. FIG. 3A is the actuator armature when the relay is in the passive state. FIG. 3B illustrates the curvature induced in the actuator armature when a relay is driven into an active state. Armature electrode contact is seen in FIG. 3C, which illustrates a possible curvature induced in the actuator armature when in the latched relay state.

FIGS. 6 through 10 illustrate an alternative embodiment. FIG. 6 is a functional plan-view illustration of an embodiment employing a thermal multimorph as a primary actuator. Two cross-sections shown along with FIG. 6 are FIGS. 7A and 8A, which illustrate cross-sectional views of a load armature and thermal multimorph actuator armature, respectively. FIG. 9 pictures a cross-sectional schematic of the armatures in the region of a multimorph actuator. In a similar manner as with FIGS. 5A and 5B for the previous embodiment, FIGS. 10A and 10B show the cross-sections of the relay region with the latching and contact mechanisms in open and closed relay states, respectively.

FIG. 7A is the load armature when the relay is in the passive state. FIG. 7B illustrates the curvature induced in the armature when a relay is driven into an active state. FIG. 7C illustrates a curvature induced in the relay when in the latched state.

FIG. 8A is the actuator armature when the relay is in the passive state. FIG. 8B illustrates the actuator armature when the relay is driven into an active state. Armature electrode contact is seen in FIG. 8C, which illustrates a possible curvature induced in the actuator armature when in the latched relay state.

Figure 11:
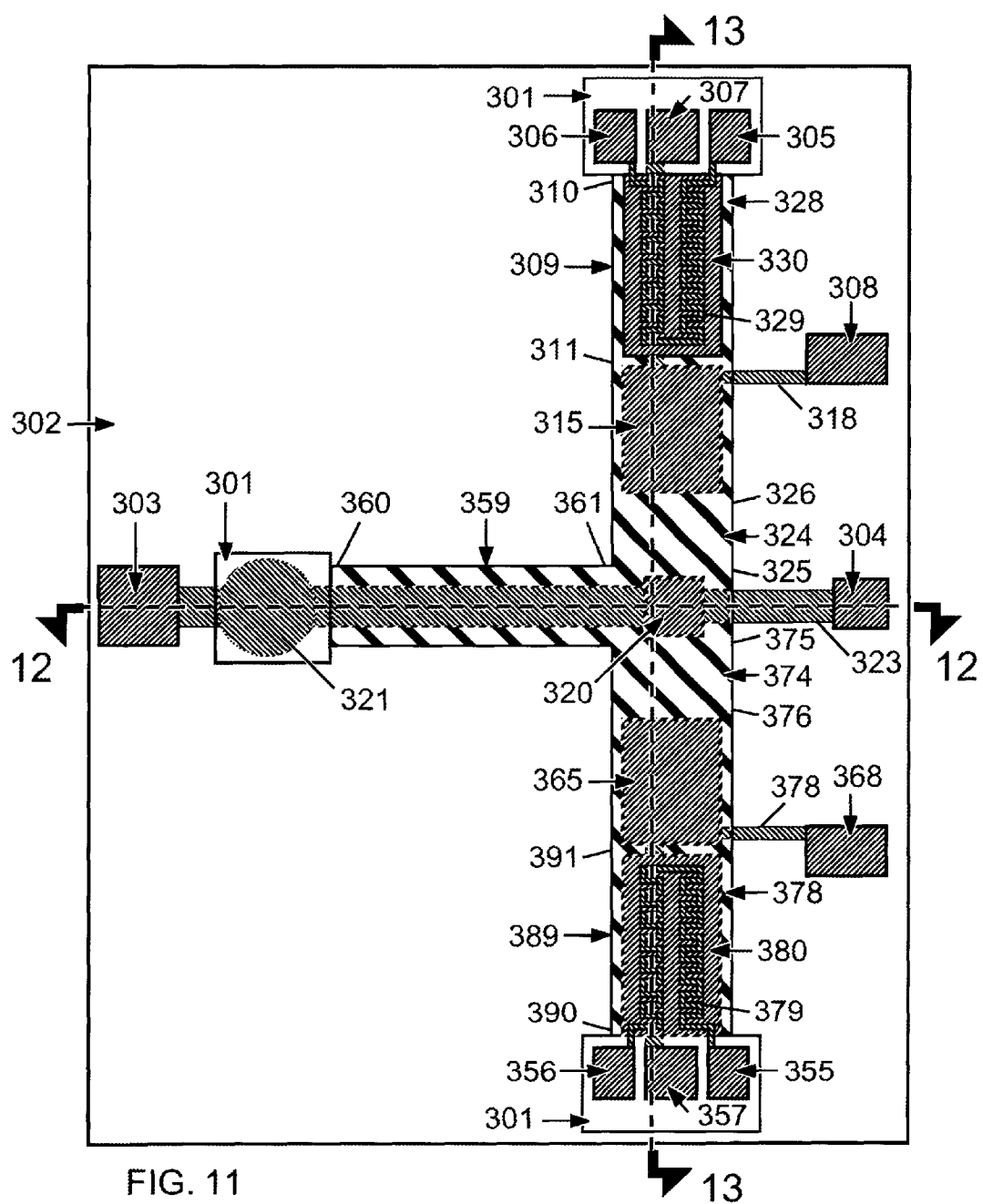

In another embodiment of the relay invention, the relay can be comprised of multiple actuator armature structures, as illustrated in FIG. 11. This relay is shown with the actuator armatures perpendicular to the load armature. Such configurations with different numbers of actuator armatures or load armatures are largely at the decision of a designer skilled in the art.

Figure 12:
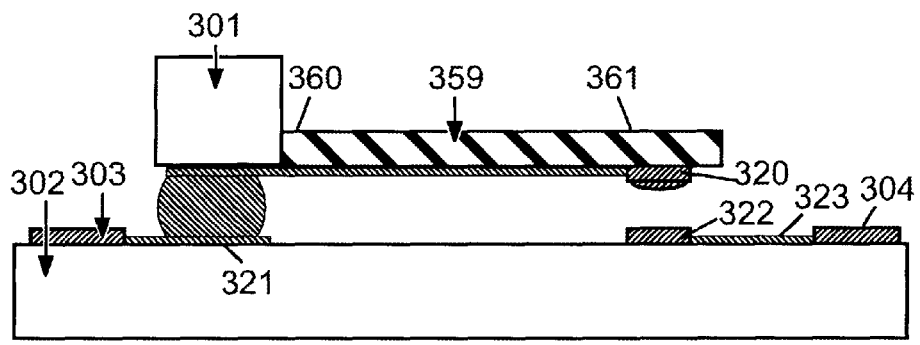

FIG. 12 illustrates a cross-sectional schematic of the load armature of this embodiment.

Figure 13A:
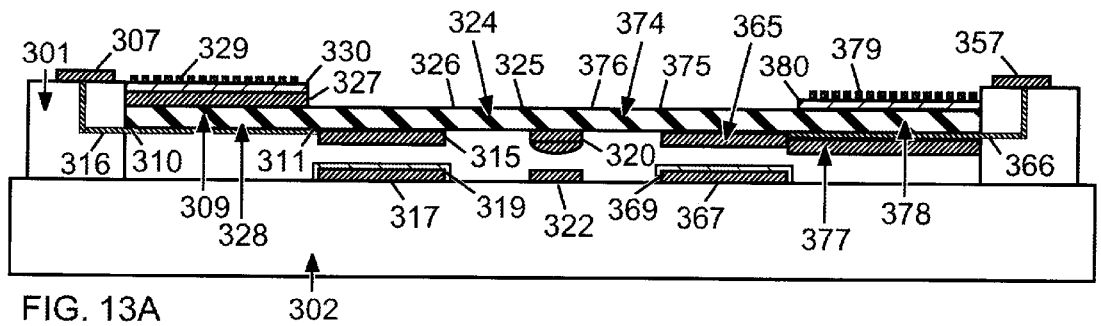
Figure 13B:
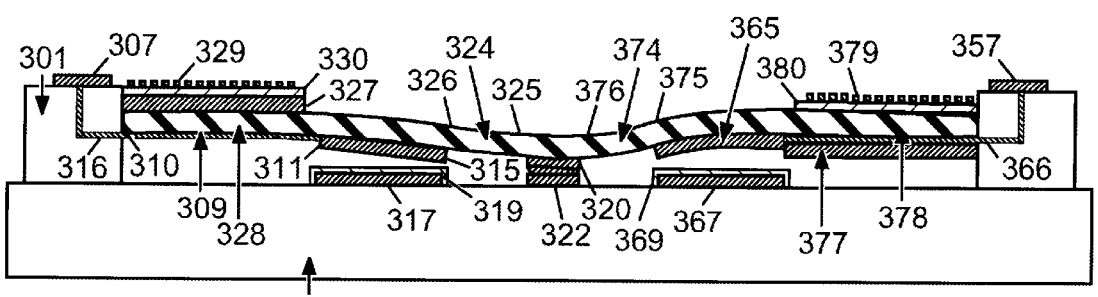
Figure 13C:
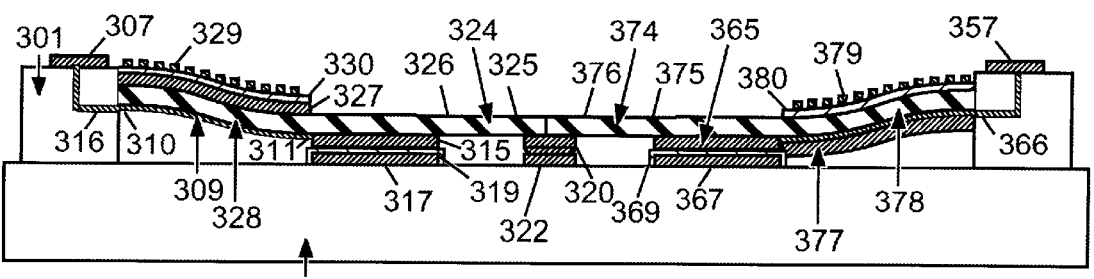
Figure 13D:
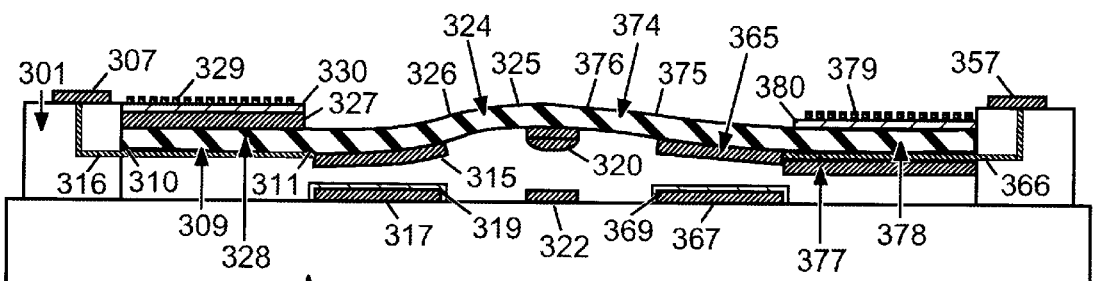

FIGS. 13A, 13B, 13C, and 13D are cross-sectional schematic illustrations of the actuator armatures of the relay in four operational states of this embodiment. Each figure depicts the thermal actuator armatures responsible for actuation to close the device and those responsible for actuation to open the device, as well as the contact armature region surrounding the contact electrodes. FIG. 13A depicts the actuator armatures when the relay is in the passive state. FIG. 13B illustrates the curvature induced in the actuator armatures when a relay is driven into an active state. FIG. 13C illustrates the actuator armatures when in the latched state. FIG. 13D illustrates the actuator armatures when one armature is driven into a drive open state.

DETAILED DESCRIPTION OF THE INVENTION

This invention is a new type of relay that incorporates the functional combination of multimorph actuator elements with electrostatic state holding mechanisms in the development of a micromachined switching device. This combination of elements provides the benefits of high-force multimorph actuators with those of zero-power electrostatic capacitive latching in microfabricated relays with high reliability and low power consumption. The following description first discusses this functional combination of actuator technologies, then continues with a detailed discussion of several specific embodiments of this invention.

A relay is a switching device with the added characteristic of having the control signal path isolated from the load signal path. Such a device enables the switching of varied or sensitive signals without interference from the control signals which might have fluctuations or irregularities capable of degrading the integrity of a sensitive load signal (such as a data stream or test equipment signal). This also protects control electronics in applications where the load signal might be dangerous in some form; a high voltage or high current load signal might overload the control electronics if allowed to interact with the control signal paths. Radio-frequency devices often require high isolation of the control electronics from the signal loads, as RF power cannot be perfectly contained due to capacitive or inductive coupling. Most relays have two stable operational states defining whether the load signal circuit is either 1) open or 2) closed. Such a device forms a valuable component in a wide variety of applications in direct current, low frequency, and radio frequency applications, and the many efforts to create microfabricated versions of relays attest to the industry interest.

Multimorph actuation mechanisms have been featured in switching devices for decades due to their ability to generate comparably high forces (mN to N contact forces) at high speeds ($\mu$sec to $\mu$sec actuation times) over moderate distances (tens of $\mu$m to mm of armature deflection) with moderate power requirements (tens of $\mu$W to tens of $\mu$W for continuous operation). Multimorph actuator technology is employed in this invention to generate moderate contact forces in order to reliably make and break electrical load signal contacts. However, multimorph actuator technologies can have several of the significant disadvantages discussed in the background section. Some technologies require constant power to maintain, for example, whereas others demonstrate weakening, unreliability, or failure if an actuator drive signal or relay state is maintained for an extended period of time (seconds to years).

In order to circumvent these undesirable attributes, this invention couples a secondary mechanism with the multimorph actuator in order to provide a low-power, non-destructive alternative for holding the relay state. Electrostatic actuation has long been a core technology in the microfabricated actuator community for its low power consumption (nW to $\mu$W) and fast closure times (100 $\mu$sec to 100 μsec). The forces (1 μN to 0.5 mN) and actuator travel distances (one to ten μm) typical for these devices is very limited, however, and most electrostatic relay efforts suffer accordingly in terms of relay insertion loss, reliability (both related to contact force), isolation, and standoff voltage (both related to gap separation).

This invention is superior to prior microfabricated relays because two actuation technologies are combined to utilize the advantages of each. In this invention, the electrostatic actuator is used to hold the device in one state, with the majority of the work required to attain that state performed by the comparably powerful multimorph actuator. In such a combination, the advantages of each actuator are realized, with the disadvantages of each eliminated.

This invention discusses microfabricated relays with overall planar dimensions of total width and length between 10 μm and 10 mm. The planar dimensions selected for a particular design would be primarily dependent on the required speed and the power level of the signal load to be switched, with ranges previously defined. Devices requiring fast or very fast switching would be designed at the low end of size ranges given, whereas devices handling high or very high signal loads would have sizes near the high end of the ranges recommended.

It is expected that a device according to the invention and intended for use with low to moderate signal loads and moderate to fast switching speeds may have planar dimensions of between 75 μm and 1.5 mm. Such dimensions might be appropriate for medium-range wireless communicators, transmit phased-array antenna electronics, or general telecommunications switching applications. It is contemplated in applications where high or very high signal load switching is required and slower speeds are acceptable, such as general purpose industrial relays or high power RF systems, that the overall planar dimensions for devices according to this invention could be between 0.5 and 10 mm. It is further contemplated that applications with light or very light signal loads requiring high speeds, such as short-range wireless communicators, antenna receiver electronics, or some automated test equipment, might demand devices according to this invention with planar dimensions between 10 and 150 μm. Each of these ranges of overall planar relay length and width can be considered reasonable to expect in the application of this invention. It is further recognized that applications demanding opposing requirements of faster switching speeds and higher signal loads for the same device may require that the device be designed with planar dimensions anywhere in the ranges suggested.

Throughout the detailed description, possible materials and sizes for elements have been suggested for applications defining a particular signal load or switching speed. It may be considered instructive to examine one embodiment of material and geometry selection for one application envisioned for this invention. Consider an application with low signal loads that allows for moderate switching speeds, such that a first embodiment represents one possible design in the application of this invention. With this embodiment illustrated in FIGS. 1–5.

FIG. 1 is a functional plan-view schematic of one general class of embodiments of this invention, wherein one cantilever load armature and one cantilever actuator armature are fixed at a common end and free to deflect at the opposing end, these free ends being mechanically coupled together by means of a contact armature. FIG. 1 is not a true planview schematic, as elements such as electrical connections and electrodes that may be buried within the device are depicted. If the fixed elements were constructed of transparent material, and conductors block line of sight through the device, the view provided by FIG. 1 would be accurate. Elements are shown with consistent cross-hatching even in plan-view, and elements below the surface are shown with a dashed outline rather than with a solid outline.

Two cross-sections shown along with FIG. 1 are FIGS. 2A and 3A, which illustrate the load armature and actuator armature, respectively. FIG. 4 is a cross-sectional schematic of the armatures in the general region of a multimorph actuator, to illustrate electrical connections and insulators. FIGS. 5A and 5B show cross-sections of the region with the latching and contact mechanisms in open and closed relay states, respectively. The bending of a contact armature is illustrated in FIG. 5B, which depicts the relay is in a fully closed and latched state.

One aspect of this relay invention is the functionality of the armatures, and whether each is responsible for the transmission of a load signal and/or a control signal. It may be instructive to examine the plan-view as well as the side-view cross-sections to note the location and function of each element as it is discussed. A fixed base (101) is a region that is rigid and integral, which may consist of a number of semiconductor, metallic, or dielectric elements that are fixed together to provide mechanical strength. The overall size of the fixed base can help define the maximum size of the attached relay and its load signal handling capabilities. A base substrate (102) comprises one part of the fixed base, which may consist of one or more microfabrication-capable dielectric or semiconductor materials such as glass, polyimide or other polymer, alumina, quartz, gallium arsenide, or silicon. The base substrate in this embodiment is polished quartz, 250 μm thick and 1 mm in each planar dimension, providing for a rigid base of microfabrication-quality material that is sufficiently large to permit ease of automated manufacture, packaging, and system insertion.

Attached to this fixed base are a first load signal line (103) and a second load signal line (104) that represent the electrical paths of the input and output of the signal to be switched by the device. Also attached to the fixed base is a first drive signal line (105) and a second drive signal line (106), the leads across which a drive signal to actuate the device is given. It is envisioned that in many devices according to this invention, the drive signal lines will be electrical paths. Additionally attached to the fixed base is a first latch signal line (107) and a second latch signal line (108) that are the leads across which a latch signal to latch the device state is given. As the latching mechanism employed in this invention is electrostatic attraction of capacitive electrodes, this latch signal is a voltage difference across the first latch signal line and the second latch signal line and are therefore electrical paths.

In the embodiment illustrated by FIGS. 1–5, the load signal lines are manufactured of 4 μm thick plated gold alloy for low relay electrical resistance, having a nickel adhesion and plating layer 0.4 μm thick. Such a metallization is sufficiently thick and of sufficiently low resistivity to permit low-loss lines for light to moderate load signals, and the nickel provides a plating layer while not considerably interfering with the electrical performance of the gold. The control signal lines and latch signal lines of this embodiment may be manufactured of the 0.4 μm nickel material without the plated gold. No load power is transmitted in the control and latch signal lines, so the low resistivity of the gold may not be needed, and lower manufacturing costs may be realized by its omission. Gold may be important for device packaging processes, such as wire bonding or flip-chip attachment, and in such instances gold plating may be used.

In an application of this invention, one set of materials that can be used for any electrical path, line, or electrode element is a set of conductive materials, also called conductors. Conductors used to manufacture relay elements according to this invention may be selected from those materials having a low resistivity, defined as having a resistivity equal to or less than 0.2 ohm-centimeter, equivalent to that of a heavily doped semiconductor. In some devices according to the invention, the materials that could be used include metals such as gold, copper, silver, platinum, nickel, and aluminum. In other devices according to this invention, the materials that could be used include doped semiconductors such as silicon, gallium arsenide, silicon germanium, and indium phosphide. It is also contemplated that any alloy or combination of metals or semiconductors with an overall low resistivity could be employed.

It is considered that the material thicknesses for electrical paths in devices according to this invention might range from 0.1 to 100 $\mu$m, depending on the application and available manufacturing techniques. It is further contemplated that the thickness of one electrical path or line in one device according to this invention could differ substantially from the thickness of a second electrical path or line in the same device due to differing electrical and manufacturing requirements. It is generally recognized to those skilled in the art that the electrical resistance of any path is related to its resistivity, its thickness, its width, and its total length. As a result, power savings can be obtained by selecting materials and geometries in a way as to reduce path resistance, particularly for signal loads of high and very high powers. Use of materials that have a high resistivity and small width and thickness can result in Joule's Heating of relay elements, and can increase signal loss within the device.

The relationship between desirable material thicknesses and applications can be made; the ranges provided assume electrical paths are fabricated of conductive materials as previously defined. It is contemplated that the material thickness of a path could range between 0.1 and 3 $\mu$m for a device according to the invention and intended for use with low signal loads and fast switching times. Such a path would be light, thin, and of higher resistance as compared to thicker paths of the same width and material, and considered useful in applications switching low or very low load signal powers. In applications with moderate signal loads and switching times, it is contemplated that the material thickness of an electrical path could range between 0.5 and 15 $\mu$m, depending on the resistivity and width of the path. In applications demanding high load signal switching, it contemplated that the material thickness of a path could range between 4 and 100 $\mu$m. Such a path would be of higher mass and lower resistance as compared to thinner paths of the same width and material.

In some devices according to this invention, the physical geometry, material properties, and electrical properties of the armatures themselves should be considered. In the embodiment illustrated in FIGS. 1–5, an actuator armature (109) is suspended from a region of the fixed base of FIGS. 1 and 3A. This actuator armature is in the form of a cantilever with one region fixed (110) and one region free to deflect (111). In some devices according to this invention, it is envisioned that armatures are constructed of one or more layers of microfabrication-capable materials such as silicon, silicon dioxide, silicon nitride, gallium arsenide, quartz, polyimide or other polymer, or a metal. The actuator armature of the discussed embodiment contains a layer of silicon dioxide 8 $\mu$m thick, selected for ease of microfabrication by chemical vapor deposition or spin-on glass techniques, and to provide an insulating rigid armature structure.

It is recognized that the vertical stiffness of a cantilever beam is approximately linear with the width of the beam, related to a third-order degree with respect to thickness, and to an inverse third-order degree with respect to length. As a result, the thickness and length are of greater design importance than width for a beam that is expected to deflect in a vertical direction normal to the substrate. It is contemplated that the overall thickness of such an armature might range from 0.2 $\mu$m to 1 mm, depending on the application, the length, and the fabrication technology used in manufacture. It is reasonable to expect an armature in a device according to this invention could have a length between 5 $\mu$m and 5 mm. The actuator armature of the presently discussed embodiment is 40 $\mu$m wide and 180 $\mu$m long, providing sufficient width to reduce the line resistance and sufficient length for flexibility of the armature.

In a device according to this invention designed for very low to low signal loads with very fast to fast switching speed, it is considered that an armature can range from 0.2 to 4 $\mu$m in thickness and between 5 and 50 $\mu$m in length. In a device designed for low to moderate signal loads with fast to moderate switching speed, it is considered that an armature can range from 1 to 40 $\mu$m in thickness, and between 25 and 500 $\mu$m in length. It is contemplated that in an application requiring moderate to high signal loads with moderate to slow switching speed, an armature thickness can range from 10 to 400 $\mu$m in thickness and between 100 $\mu$m and 2 mm in length. In a device designed for high to very high signal loads and slow to very slow switching speeds, it is contemplated that the armature could be between 200 $\mu$m and 1 mm in thickness and between 1 and 5 mm in length.

It is envisioned that the discussed armature size ranges apply not only to armatures and other elements of solid rectangular design, but also to armatures or other elements that vary in one or more dimensions by a linear or non-linear function. An example of such an armature would be a load armature that tapers from one width to a smaller width at the free end; it is recognized that such a structure may be of interest in RF applications as it can reduce input reflections and provide a higher performance than might a rectangular load signal armature.

FIG. 3A is a side view schematic of a multimorph actuator armature in a passive state. A multimorph is an element composed of two or more layers of material with different properties; the bimorph illustrated is a multimorph with exactly two such layers. The material layers of a multimorph actuator each change by a different amount when exposed to a stimulus. In the case of a piezoelectric or thermal multimorph actuator, the stimulus would be applied voltage or heat, respectively. In the case of a buckling actuator, the stimulus would be a mechanical deformation in the direction of buckling sensitivity that would be magnified by the ensuing physical action of the buckling element. In each case, layers are rigidly connected along one or more faces, so the different expansions of the materials tends to curve the multimorph in a direction away from the layer or layers with the greatest expansion.

The multimorph actuator illustrated in FIGS. 1 and 3A comprises two materials (113) and (114). Each of the two materials of the multimorph changes by a different amount due to a given stimulus. In the presently discussed embodiment, the multimorph is a piezoelectric bimorph, wherein the materials have differing coefficients of piezoelectricity. It is contemplated that in this embodiment, material (113) would have the highest coefficient of piezoelectricity out of the two materials, with element (114) representing a piezoelectrically neutral material. The piezoelectric actuator of this embodiment is formed from a 12 μm thick lead zirconate titanate (PZT) ceramic layer atop a 6 μm thick silicon dioxide layer, amounts sufficient to forcefully curl the actuator armature with readily achievable actuation voltages.

It is envisioned that piezoelectric multimorph actuators employed by devices according to this invention could include piezoelectrically active materials manufactured of out of a ceramic such as barium titanite ($BaTiO_3$), barium titanate (BaTiO), lead niobate ($PbNbO_3$), lead titanate (PbTiO), lead zirconate ($PbZrO_3$), lead zirconate titanate ("PZT" or $PbZr_xTi_yO_3$), or out of a piezoelectrically-active single crystal such as quartz ($SiO_2$), lithium sulfate ($Li_2SO_4$), lithium niobate ($LiNbO_3$), or zinc oxide (ZnO).

It is similarly envisioned that piezoelectric multimorph actuators employed by devices according to this invention could include one or more multimorph layers manufactured of an insulating material such as silicon dioxide ($SiO_2$), quartz, silicon nitride ($Si_xN_y$), or undoped silicon. The presently discussed embodiment, for example, employs a previously discussed silicon dioxide armature layer as element (114).

Conversely, it is envisioned that piezoelectric multimorph actuators employed by devices according to this invention could employ piezoelect different sensitivity to that of other multimorph layers. In other devices according to this invention, it is envisioned that one or both elements (113) and (114) may be comprised of multiple layers of materials having zero or non-zero coefficients of piezoelectricity.

It is contemplated that the material thicknesses of elements (113) and (114) might range from 0.5 μm to 1 mm, depending on the application, material, other actuator dimensions, and the fabrication technology used in manufacture. In devices according to this invention for applications requiring low to very low signal loads and high to very high switching speeds, it is considered that elements (113) and (114) can range from 0.5 to 6 μm in thickness. It is contemplated that in an application requiring moderate multimorph actuator thicknesses and associated capabilities that elements (113) and (114) can range from 4 to 80 μm in thickness. It is further contemplated that some embodiments of this invention requiring high forces for high to very high signal loads, allowing for low to very low switching speeds, may require actuators with elements (113) and (114) ranging between 50 μm and 1 mm in thickness.

In devices according to this invention that employ piezoelectric multimorph actuators, the drive signal required for actuation would be a voltage difference across the thickness or width of the piezoelectric material. FIGS. 1 and 3A illustrate one possible configuration for the drive signal lines of a piezoelectric bimorph. In the illustrated embodiment presently discussed, the drive signal lines are fabricated atop a region of the fixed base protruding above the planar surface of the base substrate. It is contemplated that in other devices according to this invention that the drive signal lines may be fabricated directly atop an electrically insulated region of the base substrate. FIG. 3A depicts drive signal connections (140) and (141) to the top and bottom surfaces of the piezoelectric material (113), respectively. These drive signal connections (140) and (141) are attached to the second and first drive signal lines, respectively. The upper first drive signal connection (140) is readily visible in FIG. 1 extending from the second drive signal path to the piezoelectric bimorph material. The lower second drive signal connection (141) from the first drive signal path disappears beneath the piezoelectric material.

Attached to the free end of the actuator armature and nominally facing the base substrate is an armature electrode (115), which is electrically attached to the first latch signal line by a conductive first latch signal path (116). Attached to the base substrate below the armature electrode is a base substrate electrode (117), which is electrically attached to the second latch signal line by a conductive second latch signal path (118). As the latch signal is a voltage difference, the armature electrode, base substrate electrode, and their conductive paths to the first and second latch signal lines will be electrical paths. As with other electrical paths, it can be contemplated that conductors may be used to fabricate the armature electrode and base substrate electrode. It is similarly considered that material thicknesses for the armature electrodes and base substrate electrodes of devices according to this invention might range between 0.1 to 100 μm, depending on the application and material as previously discussed.

The planar area of the armature electrode and the base substrate electrode is expected to be between 25 $\mu m^2$ and 25 $mm^2$ each. It is contemplated that for some devices according to this invention, the planar area of the armature electrode will be at least one half of the planar size of the multimorph actuator upon which the actuator electrode is positioned. The area shape of the electrodes in some devices according to this invention are envisioned to be squares, rectangles, circles, or some combination of planar geometric figures.

In devices with very small overall size, such as those handling very low signal loads with very fast switching speeds, the armature electrode and base substrate electrode may each be between 25 and 500 $\mu m^2$ in planar area. In devices with small overall size, such as those handling low signal loads with fast switching speeds, the armature electrode and base substrate electrode may each be between 300 and 50,000 $\mu m^2$ in planar area. It is additionally contemplated that in other devices according to this invention having moderate size, the armature electrode and base substrate electrode would each range between 30,000 $\mu m^2$ and 2 $mm^2$ in planar area. If a particular device requires large areas-to generation electrostatic latching signals on the order of 1 mN or greater, it is contemplated that the armature electrode and base substrate electrode might each range from 1 to 25 $mm^2$ in planar area.

Low resistance transmission lines such as the gold load signal line of the presently discussed embodiment is not generally necessary for an electrostatic capacitive electrode. No appreciable DC current is needed to develop or dissipate a voltage across capacitive electrodes. By eliminating thick metal where it is not needed, the overall size and weight of the relay can be reduced to improve switching speed. Each of the latch electrodes for the presently discussed embodiment are 10,000 $\mu m^2$ in rectangular area, and these electrodes as well as the latch and control signal lines are fabricated from nickel 0.4 μm thick. This nickel is the same as that used as the plating plane for the gold load signal lines, which simplifies manufacturing.

In the presently discussed embodiment of this invention, it is contemplated that a latch electrode insulator (119) may be used to prevent electrical contact from occurring between the armature electrode and the base substrate electrode when the armature is deflected. As the latch signal is a differential voltage, such electrical contact can result in the shorting of this signal, a potentially destructive event. The latch electrode insulator would be fabricated of an insulating material, where an insulating material is defined as a material with a resistivity at or above 10 ohm-centimeter. The electrode insulator of the present embodiment consist of a layer of silicon nitride 0.1 µm thick, due to the availability of high-quality thin silicon nitride films.

In devices according to this invention, it is contemplated that insulating materials that may be used for a latch electrode insulator could include insulating microfabrication materials such as undoped silicon, silicon nitride, silicon dioxide, quartz, or polyimide or other insulating polymer. It is contemplated that the material used for a latch electrode insulator may be thin relative to other material layers used in a device according to this invention, with a range from 0.05 to 2 µm thick. It is contemplated that the material thickness of a latch electrode insulator in some devices having very low to moderate actuator sizes could range between 0.05 and 0.4 µm. Such a range might be desired in an application where thin layers of insulating materials are available and are of sufficient quality to prevent a breaking down of the dielectric due to electric field strength. In some devices having moderate to very large actuator sizes, and where thin layers of high-quality insulating materials are unavailable, it is contemplated that the thickness of a latch electrode insulator could be between 0.3 and 2 µm.

In the presently discussed embodiment of this invention, the latch electrode insulator is envisioned as being affixed to the top surface of the base substrate electrode. In another device according to this invention, it is recognized that the latch electrode insulator could be affixed to the lower surface of the armature electrode. In other devices, it is considered that the latch electrode insulator could be suspended between the electrodes and mechanically attached to the relay structure at its edges by some method. It is considered that the electrodes and insulator need not be a continuous film like a membrane, but may be in a hole, line, or grid pattern in different devices, provided they are ultimately mechanically coupled to the fixed base.

The embodiment illustrated in FIGS. 1–5 features a second major armature in its design, a load armature (159) that is suspended from a region of the fixed base of FIGS. 1 and 2A. In a similar manner as the actuator armature, this load armature is in the form of a cantilever with one region fixed (160) and one region free to deflect (161). In some devices according to this invention, it is envisioned that armatures may be constructed of layers of microfabrication-capable materials such as silicon, silicon dioxide, silicon nitride, gallium arsenide, quartz, polyimide or other polymer, or metals. The actuator armature of the discussed embodiment incorporates a layer of silicon dioxide 8 µm thick, selected to provide an insulating rigid armature structure that is compatible with microfabrication techniques.

In a similar manner as with the cantilever beam of the actuator signal armature, the thickness and length of a multimorph actuator armature are of greater design importance than width for a beam that is expected to deflect in a vertical direction normal to the plane of the substrate. The load armature of the discussed embodiment is 180 µm long and 25 µm wide.

Attached to the armature of FIG. 2A in a location nominally facing the base substrate is an armature contact element (120) which is electrically connected to the first load signal line by an armature contact element path (121). In some devices according to this invention, the armature contact element, conductive path, and first load signal line are of similar materials and thicknesses for simplified manufacturing. In other devices according to this invention, it is contemplated that the armature contact element is of a different material and thickness than the conductive path and first load signal line in order to improve mechanical and electrical properties of the contact itself. In some devices, it is contemplated that the armature contact element, conductive path, and first load signal line are of different and varying materials and thicknesses for reasons related to improved performance or ease of fabrication. The armature contact element path of the discussed embodiment is a gold alloy, 5 µm thick The size of the armature contact element in devices according to this invention may be between 0.5 $\mu m^2$ and 1 $mm^2$ in overall area. The specific area shape is envisioned to be a square, a circle, an oval, or some non-standard geometric figure. In devices according to this invention that might be used in applications of very low or low signal loads, the armature contact element may be between 0.25 and 30 $\mu m^2$ in area. In devices more suitable for low or moderate signal loads, the armature contact element might be between 20 and 3,000 $\mu m^2$ in area. It is further contemplated that in devices suitable for handling high or very high signal loads, the armature contact element might be between 2,000 $\mu m^2$ and 1 $mm^2$ in total area.

The performance demands of the contact element may require the use of different material layers to provide improved mechanical wear properties over those of the other electrical path materials used in a device according this invention. It is contemplated that in one device, such different layers could include layers of hard metals such as nickel, tungsten, rhenium, rhodium, or ruthenium either below or on top of the nominal contact element surface. It is further contemplated that alloys or layered combinations of these and other low-resistivity metals can be used to fabricate the armature contact element. In devices according to this invention, it is expected that each material used for the armature contact element will have a thickness suitable for the application, which is likely to range from 0.1 to 100 µm. It is contemplated that the thickness of the armature contact element can vary across its planar area, to provide for differences in element depth and shape for a given application and embodiment.

It is contemplated that the material thickness of an armature contact element in devices according to this invention that are suitable for very low to low signal load applications may range between 0.1 and 2 µm. Such a contact element would be light, thin, and of higher resistance than thicker paths of the same material and planar geometry. In a device suitable for low to moderate signal loads, it contemplated that the material thickness of an element could range between 0.5 and 10 µm. Such an element would be of moderate mass and resistance as compared to other possible microfabricated elements and paths of the same material. In other devices that may switch high or very high load signal powers, it contemplated that the material thickness of a path could range between 5 and 100 µm. Such an element would be of high mass and low resistance as compared to thinner elements and paths of the same material. In the embodiment illustrated in FIGS. 1–5, the contact elements are of the same gold alloy used in the signal line, with the addition of a curved 0.5 µm rhenium overplate to provide a hard, wear-resistant contact area for reliable contact performance.

It is recognized that the details regarding the geometry of the contact element, the path, and the signal line need not be restricted to the specific configuration illustrated in FIGS. 1 and 2. In some devices according to this invention, it is contemplated that the conductive path could be affixed to the bottom of the armature or traverse its center rather than affixed to the top. Such geometries are present in the second and third embodiments illustrated in FIGS. 6–10 and FIGS.

11–13, accordingly. In some devices, the conductive path could represent the majority of the material of the armature, unlike the depiction of FIG. 1A, which suggests the conductor is less substantial than other materials comprising the armature. Conversely, in other devices, the mechanical properties of the armature conductor does not dominate the mechanical properties of the entire armature. Such a design may be desired as it is recognized that some conductive materials are subject to disagreeable long-term mechanical degradation. Similarly, it is contemplated that the geometry of the armature contact element is not restricted to be a flat shape, such as a curved, stepped, or surface-roughened shape.

Facing the armature contact element illustrated in FIG. 2A is a base substrate contact element (122) that is electrically connected to the second load signal line by some conductive path (123). The geometry, materials, and thicknesses of the base substrate contact element, second load signal line, and conductive path should be considered in a similar manner as with the armature contact element, first signal line, and conductive path, both in terms of general device expectations and for the specific embodiment illustrated by FIGS. 1–5.

Several elements present in FIG. 1 not visible in the cross-sectional views of FIGS. 2A or 3A are those defining the contact armature (124) of the relay. The contact armature extends from a region rigidly connected (125) to a principal armature or armature electrode to a region free to deflect (126). The functional value of this rigid connection and free region appear in the discussion of the cross-sectional schematic diagrams of FIGS. 5A and 5B. It is envisioned that the contact armature may be constructed of an insulating material as defined. It is recognized that in some devices according to this invention, the contact armature can be of the same material as inactive elements of the load armature or the actuator armature. In such a device, it is contemplated that the contact armature is integral with these elements and rigidly connected.

In devices according to this invention, it is contemplated that insulating materials used for the contact armature could include microfabrication materials such as silicon, silicon nitride, silicon dioxide, quartz, or polyimide or other insulating polymer. It is contemplated that the material used for a contact armature may range from 0.3 μm to 1 mm thick depending on material, armature geometry, and the application of the relay. In devices designed for very low or low signal loads, it is contemplated that the material thickness of a contact armature could range between 0.3 and 8 μm. In devices designed for applications of low to moderate signal loads, it is contemplated that the material thickness could range between 4 and 80 μm. In devices to be used in applications demanding stiff and thick contact armatures, such as for moderate to high signal loads, the material thickness could range between 50 and 300 μm. In yet other devices with large planar dimensions and designed for applications of high to very high signal loads, the material thickness could range between 200 μm and 1 mm.

The planar dimensions of the contact armature are contemplated as being comparable or smaller in magnitude than those of the load signal armature and the multimorph actuator armature. It is contemplated that such planar dimensions range between 2 μm and 5 mm in each of width and length depending on the application, the material thickness, and the required contact force for the relay in the latched state. In devices according to this invention where very low to low signal loads are to be switched with fast switching speeds, the planar dimensions might range between 2 and 20 μm. In devices where low to moderate signal loads are to be switched, it is envisioned that the planar dimensions could range between 10 and 200 μm. It is considered that in other devices for applications of switching moderate to high signal loads at slow speeds, planar dimensions could range between 100 μm and 1 mm. In the larger devices switching high or very high signal loads at slow to very slow speeds, the planar dimensions might range between 0.5 and 5 mm. As with the load signal armature, it is envisioned that such ranges not only apply to elements of solid rectangular design, but also to elements that vary in one or more dimensions by linear or non-linear functions.

The contact armature of the embodiment illustrated in FIGS. 1–5 is a 100 μm wide silicon dioxide beam that is 100 μm long and 6 μm thick. Such a device could provide the operating performance required for moderate power handling capabilities at moderate speed, and would contain the piezoelectric multimorph actuation as well as the electrostatic latching mechanism required.

FIG. 4 is a cross-sectional schematic of the device illustrated in FIG. 1, showing the portion of the relay incorporating the multimorph actuator. The base substrate (102), part of the fixed base, is present in this illustration, with the armatures of FIGS. 2A and 3A suspended above the top surface of the base substrate. In the presently discussed embodiment of this invention, the multimorph of FIG. 4 can be considered to be a piezoelectric multimorph actuator. The actuator includes a top piezoelectric material (113) with electrical connections of the upper first drive signal connection (140) and lower second drive signal connection (141) to the top and bottom surfaces, respectively.

In the presently discussed embodiment, the lower material (114) can be piezoelectrically neutral. This lower material (114) has the electrical connection (116) of the armature electrode affixed to the bottom surface. It is recognized that in other devices according to this invention, the armature electrode may be affixed in the middle or top of the lower material. The electrical connection (121) of the armature contact element is shown in FIG. 4, and is envisioned in the illustrated embodiment on the top planar surface of the load armature. It is recognized that each of the electrical connections could be on any insulated surface in any desired geometry in different devices. It is considered that the materials, thicknesses, and composition of the electrical paths and the multimorph actuator are flexible within the scope of the invention as discussed for the previous embodiment.

FIGS. 5A and 5B show cross-sectional schematics of the relay embodiment illustrated in FIGS. 1–5, the cross-sectional views having been taken at the free region of the principal armature system. It is recognized by those skilled in the art that this region can be an important part of relay design, as it incorporates the contact elements responsible for electrical conduction when the relay is in the closed state. The base substrate (102), part of the fixed base, is present in FIG. 5A, with the contact armature (124) suspended above the top surface of the base substrate. The contact armature is affixed (125) to the principal armature at the location of the armature electrode (115) and has a free end (126) where the armature contact element (120) is positioned. Opposite the armature electrode is the base substrate electrode (117) and affixed latch electrode insulator (119). The base substrate contact element (122) is located on the top surface of the base substrate, facing the armature contact element, and the electrical connection (123) of the armature contact element is seen extending into the center of the armature.

The bending function of the contact armature is illustrated in FIG. 5B, which depicts the same cross section as FIG. 5A except that the relay is in a closed and latched state rather than in a passive state, with these states discussed in greater detail immediately following. The contact armature is responsible for generating a bending spring force that generally forms part of the contact force between the armature contact element and the base substrate contact element. The initial gap between the latch electrodes (and latch electrode insulator) is greater than the original gap spacing between the contact elements, and this difference is the amount by which the contact armature spring must deflect when the relay is closed. It is contemplated that in some devices according to this invention, the contact armature spring force is the total contact force between the contact elements. It is further contemplated that in other devices according to this invention, the contact armature is responsible for only part of the total contact force between the contact elements. In yet other devices, it is conceived that the contact armature may provide very little or no total contact force between the contact elements.

The first stable operational state of the relay shown in FIGS. 2A, 3A, and 5A is defined as the passive state, which is the condition of the relay when no control signals are applied to the device. This is considered to be a natural condition, with device stability defined by the mechanical geometry and fabrication details of a given relay. FIGS. 2A, 3A and 5A provide typical examples of armatures in such a condition for some devices designed according to the invention, including that of the presently discussed embodiment. In these examples, the relay contact elements are not engaged, the multimorph actuator is in a nominally neutral state of equilibrium stress, and the latch electrodes are separated. It is envisioned that in other devices according to this invention the multimorph actuator armature or load signal armature can be upwardly curled rather than nominally flat when in the passive state. In yet other devices, it is considered that the multimorph actuator armature or load signal armature can be downwardly curled rather than nominally flat when in the passive state.

If a relay state different from the passive state is desired, a drive control signal can be applied to the relay actuator(s). An example of the results of such an action is a stable state defined as the first active state, where the mechanical limitations of the device prevent further deflection of the relay armatures. In some devices according to this invention, the first active state can be represented by the illustrations of FIGS. 2B and 3B, wherein the multimorph actuator of FIG. 3B is curled in a downward direction due to the drive control signal. It is considered that the armatures of FIGS. 2A and 3A are mechanically coupled in this embodiment, such that part or all of the downward curvature induced in the actuator armature can be coupled into the load signal armature, deflecting it to the point of engaging the actuator contact element and the base contact element. It is recognized that the intimate contact of the armature electrode to the latch electrode insulator of the base substrate electrode is not required by the definition of an active state. It is considered that such intimate contact can be possible, and is illustrated in the embodiment of this invention of FIG. 3B. It is additionally considered that such intimate contact may not occur in a different embodiment of this invention.

It is recognized that once the operating state of the relay has been changed from the open contacts of the passive state to the closed contacts of the first active state, it can be desirable in many applications to hold the contacts closed for what may be an indefinite period of time. An additional relay state, defined as the first latched state, is initiated by applying a latch control signal to capacitive latch elements to attract them and hold them together with electrostatic forces. It is considered that in many devices according to this invention that such an action results in the flattening of the armature electrode and the holding of the closed contact. The embodiment illustrated in FIG. 3C reflects such a condition, where the flattening of the armature electrode is reflected in a flattening of the load signal armature.

The first latched state can allow for the removal of the drive control signal from the actuator, and the relay will remain in the first latched state. It is considered that in some devices, including the presently discussed embodiment, the later removal of the latch control signal can send the relay back to the passive state. In some devices, the return to the passive state occurs due to the restoring forces internal to the armatures themselves. In other devices, it is considered that forcible assistance from a multimorph actuator will assist in the return of the relay to the passive state. An example of such assistance is not illustrated in the embodiment examples of FIGS. 1–5, but can be seen in the embodiment of FIGS. 11–13 to be discussed.

In some devices according to this invention, the piezoelectrically actuated armature of FIGS. 3A, 3B, and 3C may be comprised of two or more multimorph materials having a non-zero coefficient of piezoelectricity. In such a device, each of the non-zero coefficient materials could be a layer constructed of one or more materials of the piezoelectric ceramics or crystals described previously. In such a multimorph actuator, the upper piezoelectric material can be expanding while the lower is contracting. Such a multimorph can generate as much as double the force available for a particular device design given a fixed total actuator armature thickness.

It is recognized that multimorph actuators with one or more piezoelectric layers may be used to generate not only the closing forces as suggested in FIG. 3B, but also opening forces as well. It is considered that in some devices according to this invention, the opening forces of the multimorph can be achieved by reversing the closure drive control signal and applying its inverse. It is generally recognized that the ability to drive an actuator in either direction based on the polarity of the control signal is one advantage of a piezoelectric multimorph. It is noted that this advantage is present in piezoelectric multimorph devices according to this invention.

FIGS. 1–5 depict structural elements necessary for an embodiment featuring a single piezoelectric bimorph actuator structure driving a single contact armature. It is contemplated that this invention is intended to consider the functional concept of any relay driven by a multimorph actuator having electrostatic latching mechanisms. Additional embodiments wherein the multimorph is comprised of a different actuator material combination, or a relay is comprised of multiple contact armatures, actuator armatures, or both, is within the scope of this invention. FIGS. 6–10 illustrate a second embodiment with armatures and operation functionally equivalent to those of FIGS. 1–5. A plan-view illustration is provided in FIG. 6, with FIGS. 7–10 detailing cross-sectional views in an equivalent manner as the first embodiment. Element numbers for this second embodiment begin with 200 instead of with 100, with the last two digits referring to functional equivalents from the first embodiment for the sake of clarity.

FIG. 6 is a functional plan view schematic of a relay composed of two primary armature structures in a similar manner as the relay of FIG. 1. The elements of FIG. 6 are considered to be similar to those of FIG. 1, with differences present in the actuator components and the geometric and material selections for equivalent elements in this embodiment. As with the illustration of buried elements of FIG. 1, elements normally not visible from the top view have been outlined in dashed lines for the sake of clarity. The specific geometry and location of the signal lines and paths are at the decision of designer, and are represented in the provided embodiments for purposes of illustrative example. It is considered that the materials, thicknesses, and composition of the electrical paths are flexible within the scope of the invention as previously discussed.

Figure 7A:
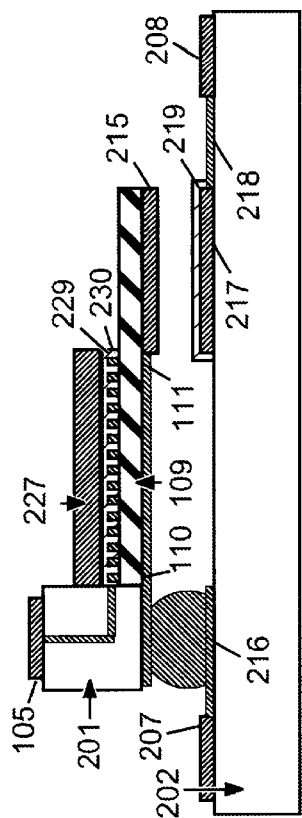
FIGS. 7A, 7B, and 7C illustrate cross-sectional views of the load armature in three operational states of the device.
Figure 7B:
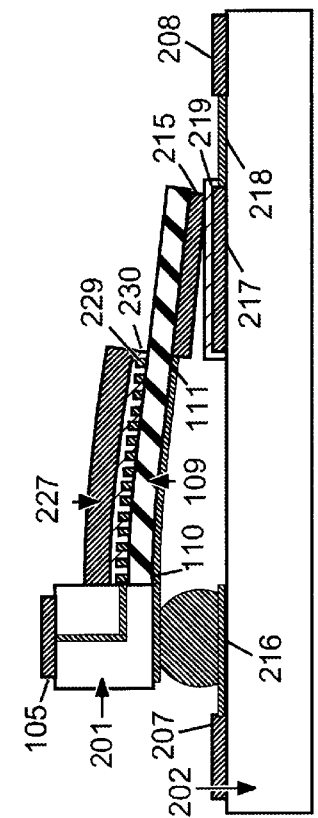
Figure 7C:
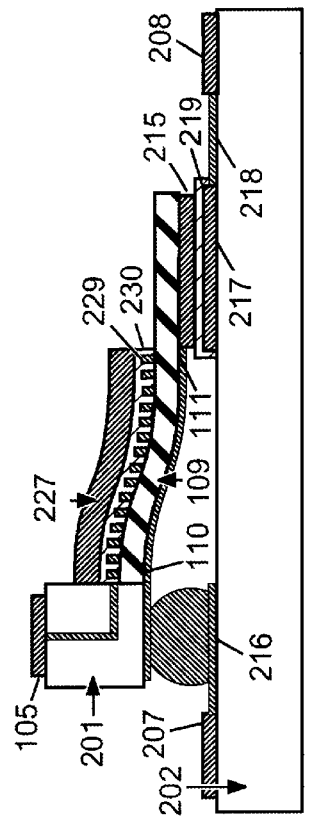
Figure 8A:
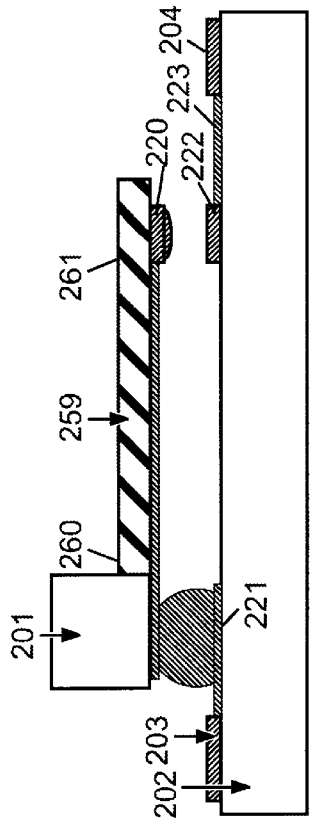
FIGS. 8A, 8B, and 8C are cross-sectional views of a thermal multimorph actuator armature in the same three operational states of the device.

The elements of the fixed base (201), base substrate (202), first (203) and second load signal lines (204), first (205) and second drive signal lines (206), and first (207) and second latch signal lines (208) are apparent as with FIG. 1. The actuator armature (209) is illustrated, with one end fixed (210) and one end (211) free to deflect in the direction normal to the base substrate. The load armature (259) is similarly shown with one end fixed (260) and one end (261) free to deflect as well. An actuator latch electrode (215) is seen, as well as the required actuator latch electrode path (216) to the latch signal control line. Note that in the presently discussed embodiment, the actuator latch electrode path is directed from the armature to the base substrate by means of a metallic anchor region, which in some devices may be a solder bump or other conductive mechanical and electrical connection. The substrate latch electrode (217) and its path (218) to the second latch control signal lines are similarly visible in FIGS. 6 and 8A. FIG. 8A illustrates that this embodiment has a latch electrode insulator (219) atop the substrate latch electrode. The actuator contact element (220) and actuator contact element path (221) to the first load signal line is present, as is the electrical connection (223) from the substrate contact element (222) to the second load signal line. The actuator contact element path in this embodiment is made from the armature to the base substrate by a metallic anchor region in a similar manner as discussed for the latch electrode path. The load armature (224) is affixed at one end (226) at the latch electrodes and free to deflect (225) in the region of the armature contact element.

The specific material and geometry for this embodiment have been selected to design a device capable of handling very low load signal powers with fast switching speeds. The load armature has planar width and length of 15 μm and 75 μm, respectively, and is fabricated from silicon nitride 2 μm thick. The load signal path and contact element are constructed of 2 μm sputtered gold. The portion of the fixed base attached to the armature fixed ends is a section of a silicon handle wafer, which is bonded to a ceramic base substrate through a gold-platinum and solder connection. All conductors on the base substrate are 2 μm thick gold. The latch electrode insulator is 0.2 μm silicon nitride.

Whereas the actuator illustrated in FIG. 3A is a piezoelectric bimorph, the primary actuator for this embodiment is a thermal multimorph. The thermal multimorph illustrated is comprised of two primary bimorph elements, an upper thermal multimorph layer (227) and a lower thermal multimorph layer (228). In this embodiment, the upper thermal multimorph layer is designed with a larger thermal coefficient of expansion. It is typical for those skilled in the art of thermal multimorph construction to use materials that are metals for thermal multimorph layers requiring large coefficients of thermal expansion. It is further recognized that it is typical to use materials that are insulators for thermal multimorph layers requiring small coefficients of thermal expansion. The multimorph in the presently discussed embodiment features a 2 μm thick palladium for the upper multimorph layer and a 2 μm thick silicon nitride for the lower multimorph layer.

It is contemplated that in some devices according to this invention that a metal can be used for layer (227) and an insulator used for layer (228). In some devices, the materials that could be used for thermal multimorph materials include metals such as gold, copper, silver, platinum, nickel, and aluminum. In some devices, the materials that could be used for either layer include semiconductors such as silicon, gallium arsenide, silicon germanium, and indium phosphide. It is also contemplated that any alloy or layered combination of metals or semiconductors could be employed in devices according to this invention. It is further contemplated that the materials that could be used for thermal multimorph materials include insulators such as silicon, silicon nitride, silicon dioxide, quartz, or polyimide or other insulating polymer. It is also recognized that each of layers (227) and (228) can be comprised of a stack of layers in order to design specific properties into an actuator.

It is contemplated that the thicknesses of thermal multimorph actuator layers may range from 0.1 to 500 μm, depending on the material, fabrication processes, application, and the geometries of other elements. In some devices according to this invention that may switch very low to low signal loads with high or very high switching speeds, it is considered that layers (227) and (228) may range from 0.1 to 3 μm in thickness. It is contemplated that in an application requiring low to moderate signal loads with high or moderate switching speeds, layers (227) and (228) might range from 2 to 30 μm in thickness. It is further contemplated that some devices require thicker multimorph actuators, such as might be necessary in applications demanding moderate to heavy signal loads at moderate to slow switching speeds, and might employ layers (227) and (228) ranging between 20 and 200 μm in thickness. It is envisioned that applications of high or very high signal loads switching at slow or very slow speeds, materials (227) and (228) might range between 150 and 500 μm thick. It is recognized that the thicknesses or thickness ranges of multimorph layers need not be similar for different layers.

Figure 8B:
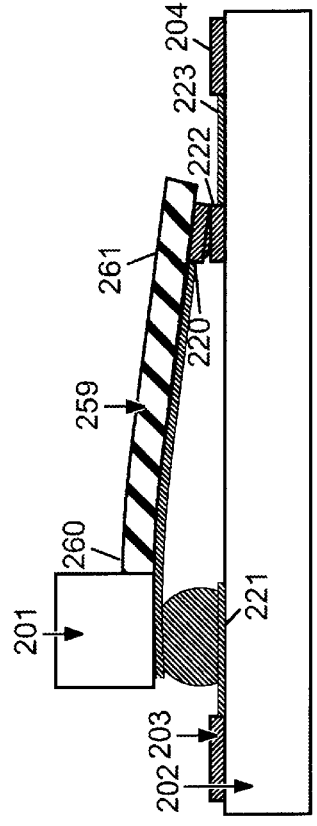
Figure 8C:
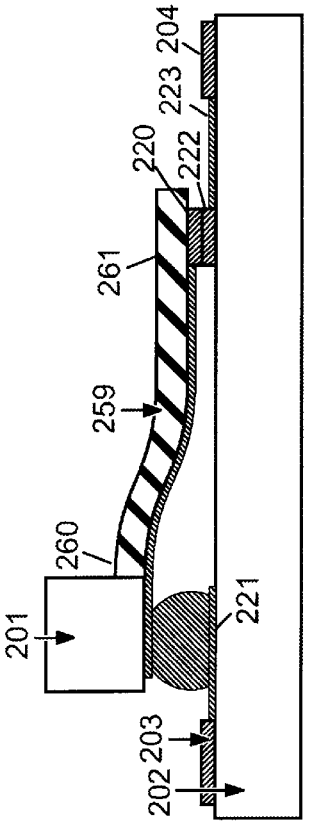

FIG. 8 includes a schematic representation of the cross-section of a heating element (229). It is contemplated that in some devices such an element may be a resistive conductor trace in a path on the surface of an insulating layer. In the presently discussed embodiment, the heating element is fabricated from a 0.3 μm thick nickel-chrome alloy. It is contemplated that in some devices according to this invention, a heating element can be fabricated from a material with a resistivity between 0.001 and 10 ohm-cm. In some devices, a heating element may be constructed of a metal or semiconducting material. It is considered that the thickness of a resistive heating element in a device can range between 0.05 and 10 μm. It is contemplated that in some devices, wherein the resistive material may have a resistivity less than 0.1 ohm-cm, the thickness may be between 0.05 and 2 μm. It is further contemplated that in some devices which include a resistive material with a resistivity greater than 0.1 ohm-cm, the thickness may be between 0.5 and 10 μm.

Shown in FIG. 8A is a heating element insulator (230), which in the present embodiment electrically isolates the heating element from a conductive multimorph layer. It is recognized that if the upper thermal multimorph layer (227) were constructed of a metal in a device according to this invention, an insulating layer would insulate the heating element (229) from the layer (227) to allow the heating element to operate properly. The presently discussed embodiment considers that the upper thermal multimorph layer (227) is conductive, and therefore benefit from insulation from the heating element. The embodiment depicted also considers that the lower multimorph layer (228) is insulating, and could therefore be adjacent to the heating element without interfering with its proper operation.

The heating element insulator would be fabricated of an insulating material as previously defined for the latch electrode insulator. It is contemplated that in some devices according to this invention, possible materials that may be used to fabricate the heating element insulator include silicon nitride, silicon dioxide, quartz, or polyimide or other insulating polymer. It is contemplated that the material used for a heating element insulator may be thin relative to some other material layers used in the fabrication of a particular device, with a range from 0.05 to 3 μm thick. It is contemplated that the material thickness of an insulating element in one device could range between 0.05 and 0.5 μm. Such a range might be desired in an application where thin layers of insulating materials are available and are of sufficient quality to prevent a breaking down of the dielectric due to electric field strength. The heating element insulator of the present embodiment is 0.1 μm of high-quality silicon nitride. In other devices, where thin layers of high-quality insulating materials are unavailable, it is contemplated that the material thickness of a latch electrode insulator could range between 0.3 and 3 μm.

FIG. 9 is a cross-sectional schematic of the device illustrated in FIG. 6, showing the portion of the relay incorporating the multimorph actuator. The base substrate (202), part of the fixed base, is present in this illustration, with the armatures of FIGS. 7A and 8A suspended above the top surface of the base substrate. In the presently discussed embodiment of this invention, the multimorph of FIG. 8 is a thermal multimorph actuator. The actuator includes a top thermal multimorph layer (227) with the heating element electrical connections of the first drive signal connection (240) and second drive signal connection (241) shown, each forming part of the heating element itself and surrounded by the heating element insulator (229). The lower thermal multimorph layer (241) is the same material as the actuator armature (209), and the actuator latch electrode path (216) is shown at the bottom surface of this armature. The load signal path (221) is shown at the bottom of surface of the load armature in a similar manner. The drive signal paths are fabricated from the 0.3 μm nickel-chrome alloy of the heating element, the latch signal path is fabricated from a 0.2 μm nickel layer, and the load signal path is fabricated from a 2 μm sputtered gold layer.

FIGS. 10A and 10B show cross-sectional views having been taken at the free region of the principal armature system. This region incorporates the contact elements responsible for electrical conduction when the relay is in the closed state. The base substrate (202), part of the fixed base, is present in FIG. 10A, with the contact armature (224) suspended above the top surface of the base substrate. The contact armature is affixed (225) to the principal armature at the location of the armature electrode (215) and has a free end (226) where the armature contact element (220) is positioned. Opposite the armature electrode is the base substrate electrode (217) and affixed latch electrode insulator (219). The base substrate contact element (222) is located on the top surface of the base substrate, facing the armature contact element. The bending function of the contact armature is illustrated in FIG. 10B, which depicts the same cross section as FIG. 10A except that the relay is in a closed and latched state rather than in a passive state, with these states discussed in the detailed description of FIGS. 5A and 5B.

FIG. 11 is a functional plan view schematic depicting a third embodiment, wherein the relay is composed of three primary armatures instead of two as with the first embodiments discussed. The relay of FIG. 11 has been designed such that the actuator armatures are perpendicular to the load signal armature. It is recognized that the configuration for parallel or perpendicular actuator armatures, and the specific number of each armature, in a specific device design is a feature at the decision of those skilled in the art for varying materials, geometries, and applications. FIG. 12 is a cross-sectional schematic of the load armature in a passive, open state. FIGS. 13A through 13D depict a cross-section of the thermal bimorph actuators and contact armatures of the embodiment. Element numbers for this third embodiment begin with 300, with the last two digits referring to functional equivalents from the first and second embodiments for the sake of clarity.

The elements of FIG. 11 are considered to be similar to those of FIGS. 1 and 6, with differences present in the actuator components and the geometric and material selections for equivalent elements in this embodiment. As with the illustration of buried elements of FIGS. 1 and 6, elements normally not visible from the top view have been outlined in dashed lines for the sake of clarity. The specific geometry and location of the signal lines and paths are at the decision of designer, and are represented in the provided embodiments for purposes of illustrative example. It is considered that the materials, thicknesses, and composition of the electrical paths are flexible within the scope of the invention as previously discussed.

The elements of the fixed base (301), base substrate (302), first (303) and second load signal lines (304), first (305) and second drive signal lines (306), and first (307) and second latch signal lines (308) are shown. The closing actuator armature (309) is seen, with one end fixed (310) and one end (311) free to deflect in the direction normal to the base substrate. The load armature (359) is shown perpendicular to the closing actuator armature, with its one end fixed (360) and one end (361) free to deflect normal to the substrate. The opening actuator armature (389) is seen opposite the closing actuator armature, and has a fixed end (390) and free end (391) in a mirrored fashion.

The armatures for the embodiment shown have been designed to carry a large load signal at slow switching speeds. The primary material for the armatures is a single-crystal silicon layer 12 μm thick. The load armature is 200 μm wide and 800 μm long. The actuator armatures are 250 μm wide and 650 μm long. The load signal lines and paths are fabricated from an 8 μm thick copper alloy. The control signal and latch signal lines and paths are fabricated from a sputtered 2 μm thick nickel-chrome alloy.

An actuator latch electrode (315) is seen for the closing actuator armature, and a second latch electrode (365) is seen for the opening actuator armature. The required latch electrode paths (316) and (366) to the latch signal control lines (307) and (357), respectively, can be seen clearly in FIG. 13A. A substrate latch electrode path (318) of the closing actuator armature substrate latch electrode (317) to the second latch control signal lines may be seen. In a similar manner, the substrate latch electrode path (378) of the opening actuator armature substrate latch electrode (367) are illustrated in FIG. 11. The actuator contact element (320) and load signal path (321) to the first load signal line can be seen in FIGS. 11 and 12. The substrate contact element path (323) from the substrate contact element (322) to the second load signal line is clearly illustrated in FIG. 12.

Due to the dual actuator design of the relay of FIG. 11, multiple contact armatures are present. The closing actuator contact armature (324) is affixed at one end (326) at the latch electrodes and free to deflect (325) in the region of the armature contact element. The opening actuator contact armature (374) is affixed at one end (326) at the latch electrodes and free to deflect (325) in the region of the armature contact element. The closing actuator is comprised of an upper thermal bimorph layer (327) and a lower thermal bimorph layer (328) with similar material and geometry considerations as the thermal multimorph of the previous embodiment and illustrated most clearly in FIG. 13A. The opening actuator is comprised of an expansive thermal bimorph layer (377) beneath the nominal armature layer (378).

A resistive closing heating element (329) provides a method of heating the closing bimorph actuator with a control signal consisting of an electric current. As with the resistive element (229) previously discussed, it is considered that such an element might be a resistive meandering path on the surface of an insulating layer (330). It is further considered that the materials and thicknesses for such an element would be similar to those discussed for the previous embodiment. An opening heating element (379) provides a method of heating the opening bimorph actuator in a similar manner. This element is electrically insulated by a heating element insulator (380). It is recognized that the fixedbeam of the dual thermal bimorph actuators results in a constrained range of motion relative to a cantilever arrangement.

FIG. 13A is a cross-sectional schematic illustration of the thermal bimorph actuator relay embodiment depicted in FIG. 11, with elements in accordance with FIGS. 11 and 12, and in a neutral state without actuation or latch signals applied. It is recognized in the presently discussed embodiment that the two multimorph actuators actuate in opposing directions. In this embodiment, the closing actuator deflects the armature contact element in a downward direction when a closing control signal is applied, whereas the opening actuator deflects in an upward direction normal to the base substrate when an opening control signal is applied.

The relay states of the embodiment illustrated in FIGS. 6–10 were identical to those of the first embodiment of FIGS. 1–5. In a similar manner as with the previous embodiments, FIG. 13B is a cross-sectional schematic of a device in the stable first active state, wherein the mechanical limitations of the device prevent further armature deflection. The closing actuator of FIG. 13B is curled in a downward direction due to the drive control signal, though severely constrained by the fixed beam condition and bending forces of the contact armatures. It is considered that the armatures of FIGS. 12 and 13 are mechanically coupled in this embodiment, such that part or all of the downward curvature induced in the actuator armature can be coupled into the load signal armature, deflecting it to the point of engaging the actuator contact element and the base contact element. It is recognized that the contact of the armature electrode to the latch electrode insulator of the base substrate electrode is not required though such is shown.

The first latched state for this embodiment is initiated by applying a latch control signal to both sets of latch electrodes to attract them and hold them together with electrostatic forces. It is considered that in many devices according to this invention that such an action results in the flattening of the armature electrode and the holding of the closed contact. The embodiment illustrated in FIG. 13C reflects such a condition. The first latched state allows for the removal of the drive control signal from the actuator, and the relay will remain in the first latched state.

It is considered that in some devices, the later removal of the latch control signal can send the relay back to the passive state due to the restoring forces internal to the armatures themselves. In other devices, including the presently discussed embodiment, it is considered that forcible assistance from an opening actuator will assist in the return of the relay to the passive state. FIG. 13D illustrates this new stable state, the second active state, wherein the drive open signals are applied to the opening signal lines, and no latch signals or other control signals are present. The thermal multimorph of the opening actuator is designed to curl in an upwards direction when actuated, and this upwards curl is illustrated in FIG. 13D, though it is severely constrained by the fixed beam conditions of the actuator armatures.

It should be understood that various changes and modifications to the present embodiments will be apparent to those skilled in the art. Such changes and modifications may be made without changing the spirit and scope of the present invention and without diminishing its attendant advantages.

We claim:
1. A microfabricated relay comprising:
   a substrate;
   a base attached to the substrate;
   load signal lines comprising
      a first load signal line and
      a second load signal line;
   control signal lines comprising
      a first drive signal line,
      a second drive signal line,
      a first latch signal line, and
      a second latch signal line;
   a compound armature structure comprising
      a latch armature structure, the latch armature structure comprising
         an anchor region attached to the base,
         a latch deflection region, the latch deflection region comprising
            a first region attached to the anchor region and
            a second region that is moveable between a passive position and a latched position, the latch deflection region further comprising
               a first material that changes size by a first amount in response to a stimulus and
               a second material that changes size by a second amount due to the stimulus, the first and second amounts being unequal and applying a deflection force to the latch deflection region in response to the stimulus, the deflection force tending to move the second region from the passive position toward the latched position;
      a first latch electrode, the first latch electrode being located on a portion of a lower surface of the second region of the latch deflection region and electrically connected to the first latch signal line;
      a second latch electrode, the second latch electrode being formed on the substrate generally below the first latch electrode and electrically connected to the second latch signal line;
      a latch electrode insulator, the first electrode insulator preventing electrical contact between the first latch electrode and the second latch electrode when the second region of the deflection region is in the latched position;
      a means for applying the stimulus to the latch deflection region comprising
         a first drive electrode electrically connected to the first drive signal line and
         a second drive electrode electrically connected to the second drive signal line;

a load armature structure comprising
an anchor region attached to the base;
a coupling region joining the load armature structure to the latch armature structure;
a contact deflection region comprising
a first region attached to the anchor region and
a second region that is moveable between an open position and a closed position,
the closed position being established when the second region of the latch deflection region is in the latched position;
a first contact electrode formed on a portion of a lower surface of the second region of the contact deflection region, the first contact electrode being electrically connected to the first load signal line; and
a second contact electrode, the second contact electrode being electrically connected to the second load signal line and located on the substrate generally beneath the first contact electrode, the first contact electrode and the second contact electrode being brought into electrical contact having a contact force when the contact deflection region is in the closed position, the contact deflection region moving in conjunction with the latch deflection region.

2. A microfabricated relay according to claim 1, wherein:
the first material has a first coefficient of thermal expansion;
the second material has a second coefficient of thermal expansion; and
an electrical current flowing between the first drive electrode and the second drive electrode provides a thermal stimulus and thereby generates the deflection force within the latch deflection region of the latch armature structure.

3. A microfabricated relay according to claim 2, wherein:
the electrical current flows through a resistive heating element, the resistive heating element being incorporated into the latch deflection region of the latch armature structure.

4. A microfabricated relay according to claim 3, wherein:
the resistive heating element is incorporated into a layer of the first material.

5. A microfabricated relay according to claim 3, wherein:
the resistive heating element is incorporated between a layer of the first material and a layer of the second material.

6. A microfabricated relay according to claim 1, wherein:
the latch electrode insulator is formed on the first latch electrode.

7. A microfabricated relay according to claim 1, wherein:
the latch electrode insulator is formed on the second latch electrode.

8. A microfabricated relay according to claim 1, wherein:
a layer of the first material has a first level of piezoelectric response;
a layer of the second material has a second level of piezoelectric response; and
a voltage applied between the first drive electrode and the second drive electrode provides a piezoelectric stimulus and thereby generates the deflection force within the latch deflection region of the latch armature structure.

9. A microfabricated relay according to claim 8, wherein: one of the first material or the second material has a level of piezoelectric response that is essentially zero.

10. A microfabricated relay according to claim 8, wherein:
the latch deflection region further comprises a layer of a third material,
the third material having a third level of piezoelectric response,
the third level of piezoelectric response being unequal to zero;
the voltage applied between the first drive electrode and the second drive electrode being applied across the layer of the third material; and
the piezoelectric response of the layer of the third material contributing to the deflection force generated within the latch deflection region of the latch armature structure.

11. A microfabricated relay according to claim 1, wherein:
a layer of the first material has a first initial level of internal stress; and
a layer of the second material has a second initial level of internal stress;
at least one of the first and second initial levels of internal stress being compressive;
wherein an application of a mechanical deflection stimulus to the latch armature structure results in a buckling of the latch armature structure in the direction of the mechanical deflection stimulus, the buckling releasing a portion of the compressive initial level of internal stress, to thereby move the second region of the latch deflection region into the latched position.

12. A microfabricated relay according to claim 11, wherein:
an external mechanical means applies the mechanical deflection stimulus to the latch armature structure.

13. A microfabricated relay according to claim 11, wherein:
the response of the latch deflection region to the stimulus applies the mechanical deflection stimulus to the latch armature structure.

14. A microfabricated relay according to claim 13, wherein:
the stimulus is a thermal stimulus.

15. A microfabricated relay according to claim 13, wherein:
the stimulus is a piezoelectric stimulus.

16. A microfabricated relay according to claim 11, wherein:
a least a portion of the mechanical deflection stimulus is applied by a shape-memory effect, wherein:
a layer of the first material has a first level of shape-memory effect for expansion; and
a layer of the second material has a second level of shape-memory effect.

17. A method of operating a microfabricated relay constructed according to claim 1, comprising the steps of:
establishing a passive state in which
the second region of the latch armature structure is in the passive position and
the second region of the load armature structure is in the open position;
establishing a first active state
by applying a stimulus to the latch armature structure in which a first voltage is applied between the first drive electrode and the second drive electrode,
the voltage being of sufficient magnitude and duration to apply a deflection force to the deflection region of the latch armature structure,
the deflection force being sufficient to move the first latch electrode into close proximity with the second latch electrode and establish the latched position and the deflection force being transferred through the coupling region to the contact deflection region structure and moving the first contact electrode into electrical contact with the second contact electrode, thereby establishing electrical contact between the first load signal line and the second load signal line;

establishing a first latched state in which
a second voltage is applied between the first latch electrode and the second latch electrode, the second voltage inducing an electrostatic attachment between the first latch electrode and the second latch electrode,
the electrostatic attachment being of sufficient strength to maintain the latched position without continuing application of the first voltage,
and the first voltage is decreased to approximately zero;
maintaining the second voltage for a period of time; and
setting the second voltage to approximately zero,
thereby allowing the microfabricated relay to return to the passive state.

18. A microfabricated relay comprising:
a substrate;
a first base and a second base;
load signal lines comprising
a first load signal line and
a second load signal line;
control signal lines comprising
a first drive signal line,
a second drive signal line,
a first latch signal line, and
a second latch signal line;
a compound armature structure comprising
a latch armature structure, the latch armature structure comprising
a first anchor region attached to the first base,
a second anchor region attached to the second base,
a latch deflection region, the latch deflection region comprising
a first region attached to the first anchor region,
a second region attached to the second anchor region, and
a third region that is moveable between a passive position and a latched position, the latch deflection region further comprising
a first material that changes size by a first amount in response to a stimulus and
a second material that changes size by a second amount due to the stimulus,
the first and second amounts being unequal and applying a deflection force to the latch deflection region in response to the stimulus, the deflection force tending to move the second region from the passive position toward the latched position;
a first latch electrode, the first latch electrode being located on a portion of a lower surface of the first region of the latch deflection region and electrically connected to the first latch signal line;
a second latch electrode, the second latch electrode being located on a portion of a lower surface of the second region of the latch deflection region and electrically connected to the first latch signal line;
a third latch electrode, the third latch electrode being formed on the substrate generally below the first latch electrode and electrically connected to the second latch signal line;
a fourth latch electrode, the fourth latch electrode being formed on the substrate generally below the second latch electrode and electrically connected to the second latch signal line;
a first latch electrode insulator, the first electrode insulator preventing electrical contact between the first latch electrode and the third latch electrode when the third region of the deflection region is in the latched position;
a second latch electrode insulator, the second electrode insulator preventing electrical contact between the second latch electrode and the fourth latch electrode when the third region of the deflection region is in the latched position;
a means for applying the stimulus to the latch deflection region comprising
a first drive electrode electrically connected to the first drive signal line and
a second drive electrode electrically connected to the second drive signal line;
a load armature structure comprising
an anchor region attached to a third base;
a coupling region joining the load armature structure to the latch armature structure;
a contact deflection region comprising
a first region attached to the third anchor region and
a second region that is moveable between an open position and a closed position,
the closed position being established when the third region of the latch deflection region is in the latched position;
a first contact electrode formed on a portion of a lower surface of the second region of the contact deflection region, the first contact electrode being electrically connected to the first load signal line; and
a second contact electrode, the second contact electrode being electrically connected to the second load signal line and located on the substrate generally beneath the first contact electrode, the first contact electrode and the second contact electrode being brought into electrical contact having a contact force when the contact deflection region is in the closed position, the contact deflection region moving in conjunction with the latch deflection region.

19. A microfabricated relay according to claim 18, wherein:
the first contact electrode is formed on a lower surface of the third region of the latch deflection region, the contact electrode being positioned between the first latch electrode and the second latch electrode.

20. A microfabricated relay according to claim 18, wherein
the latch deflection region further comprises
a third material that changes size by a third amount in response to a second stimulus and
a fourth material that changes size by a fourth amount due to the second stimulus,
the third and fourth amounts being unequal and applying a deflection force to the latch deflection region in response to the second stimulus, the deflection force tending to move the second region from the latched position toward the passive position;
a means for applying the second stimulus to the third material and the fourth material in the latch deflection region comprising
a third drive electrode electrically connected to a third drive signal line and
a fourth drive electrode electrically connected to the fourth drive signal line.

* * * * *